(12) United States Patent
Ketchel et al.

(10) Patent No.: US 11,274,741 B2
(45) Date of Patent: Mar. 15, 2022

(54) ULTRA-LIGHTWEIGHT REAR AXLE DRIVE (ULRAD) ASSEMBLY WITH CLUTCH LUBRICATION SYSTEM

(71) Applicant: MAGNA POWERTRAIN OF AMERICA, INC., Troy, MI (US)

(72) Inventors: Bradley Ketchel, Oxford, MI (US); Wade Smith, Mussey, MI (US); Ryan Strand, Rochester Hills, MI (US); Ryan Shaw, Southfield, MI (US)

(73) Assignee: MAGNA POWERTRAIN OF AMERICA, INC., Troy, MI (US)

( * ) Notice: Subject to any disclaimer, the term of this patent is extended or adjusted under 35 U.S.C. 154(b) by 238 days.

(21) Appl. No.: 16/497,709

(22) PCT Filed: Apr. 3, 2018

(86) PCT No.: PCT/US2018/025847
§ 371 (c)(1),
(2) Date: Sep. 25, 2019

(87) PCT Pub. No.: WO2018/187299
PCT Pub. Date: Oct. 11, 2018

(65) Prior Publication Data
US 2021/0285536 A1  Sep. 16, 2021

Related U.S. Application Data

(60) Provisional application No. 62/481,174, filed on Apr. 4, 2017.

(51) Int. Cl.
*F16H 57/04* (2010.01)
*B60K 17/02* (2006.01)
(Continued)

(52) U.S. Cl.
CPC ......... *F16H 57/0457* (2013.01); *B60K 17/02* (2013.01); *B60K 17/344* (2013.01);
(Continued)

(58) Field of Classification Search
CPC ............................................. F16H 57/04–0473
See application file for complete search history.

(56) References Cited

U.S. PATENT DOCUMENTS

| 3,383,937 A | 5/1968 | Toenne et al. |
| 2007/0026983 A1 | 2/2007 | Shimizu et al. |

(Continued)

FOREIGN PATENT DOCUMENTS

| DE | 3546454 A1 | 2/1987 |
| DE | 102015222892 A1 | 5/2017 |
| JP | 2013181638 A | 9/2013 |

OTHER PUBLICATIONS

International Search Report and Written Opinion related to PCT/US2018/025847 dated Jun. 22, 2018.
(Continued)

*Primary Examiner* — Ernesto A Suarez
*Assistant Examiner* — Lillian T Nguyen
(74) *Attorney, Agent, or Firm* — Dickinson Wright PLLC

(57) ABSTRACT

A pumpless lubrication system for a power transfer assembly equipped with a hypoid gearset having a ring gear and a hollow pinion unit. Lubricant splashed from one of the ring gear and the pinion unit is collected in a collection reservoir and directed through a conduit unit into the hollow pinion unit. The lubricant is delivered to a torque transfer coupling for lubricating and cooling a multi-plate clutch pack.

17 Claims, 16 Drawing Sheets

(51) Int. Cl.
  *B60K 17/344* (2006.01)
  *F16D 13/52* (2006.01)
  *F16D 13/72* (2006.01)
  *F16D 13/74* (2006.01)
  *F16H 1/14* (2006.01)
  *F16H 48/42* (2012.01)
  *F16H 57/02* (2012.01)

(52) U.S. Cl.
  CPC .............. *F16D 13/52* (2013.01); *F16D 13/72* (2013.01); *F16D 13/74* (2013.01); *F16H 1/145* (2013.01); *F16H 48/42* (2013.01); *F16H 57/043* (2013.01); *F16H 57/045* (2013.01); *F16H 57/0423* (2013.01); *F16H 57/0426* (2013.01); *F16H 57/0473* (2013.01); *F16H 57/0483* (2013.01); *F16H 2057/02052* (2013.01)

(56) References Cited

U.S. PATENT DOCUMENTS

| | | | |
|---|---|---|---|
| 2008/0032843 | A1 | 2/2008 | Ebihara et al. |
| 2010/0101351 | A1* | 4/2010 | Later .................. F16H 57/0421 74/467 |
| 2016/0298744 | A1 | 10/2016 | Bujold et al. |
| 2017/0356535 | A1* | 12/2017 | Peura ...................... F16D 13/52 |

OTHER PUBLICATIONS

German Search Report; Appl. No. 11 2018 001 868.7; dated Dec. 13, 2021; 7 pages.

* cited by examiner

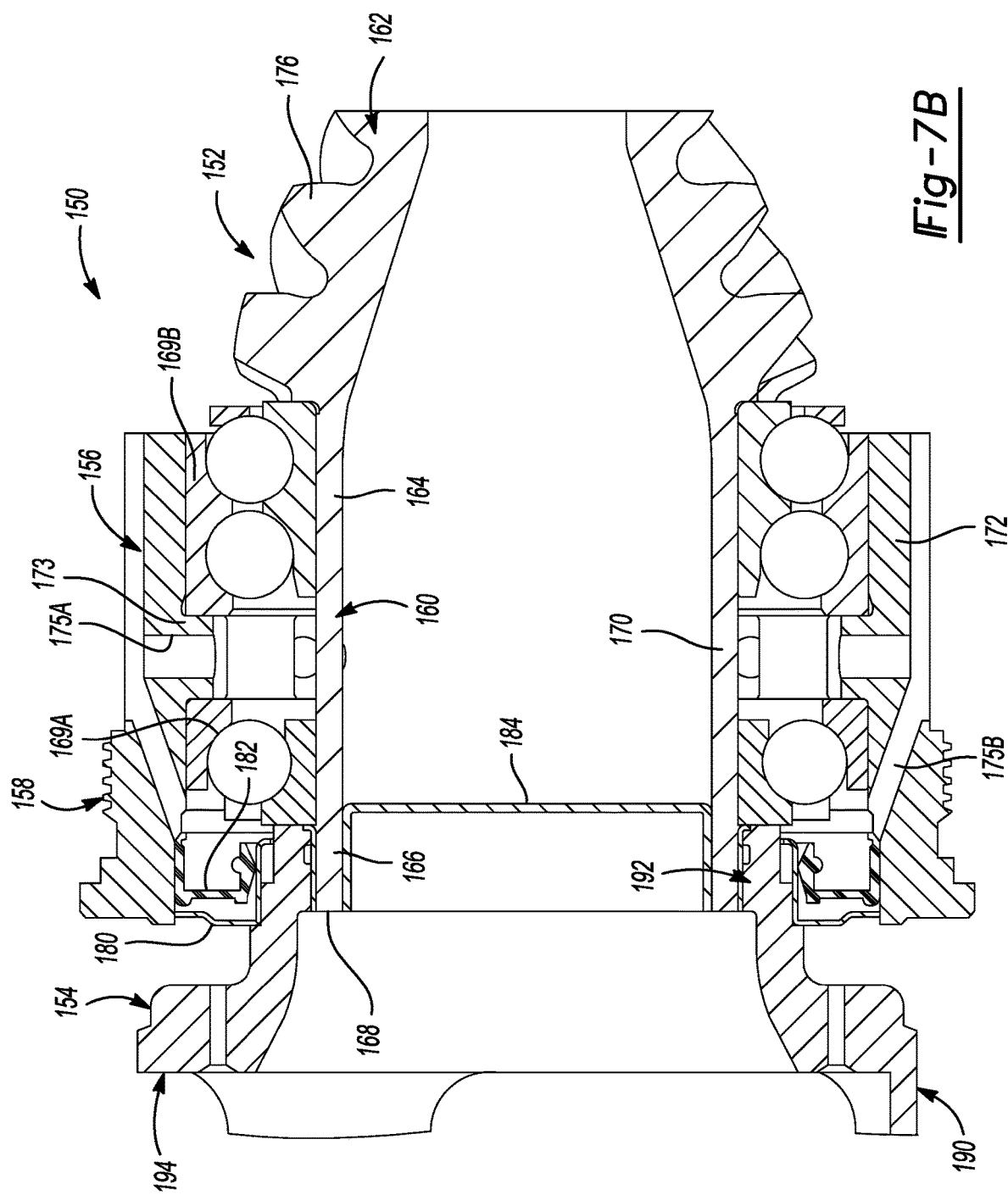

ULTRA-LIGHTWEIGHT REAR AXLE DRIVE (ULRAD) ASSEMBLY WITH CLUTCH LUBRICATION SYSTEM

CROSS REFERENCE TO RELATED APPLICATIONS

This application is a National Stage of International Application No. PCT/US2018/025847 filed Apr. 3, 2018, and titled "ULTRA-LIGHTWEIGHT REAR AXLE DRIVE (ULRAD) ASSEMBLY WITH CLUTCH LUBRICATION SYSTEM," which claims the benefit of and priority to U.S. Provisional Application Ser. No. 62/481,174 filed Apr. 4, 2017, and titled "ULTRA-LIGHTWEIGHT REAR AXLE DRIVE (ULRAD) ASSEMBLY WITH CLUTCH LUBRICATION SYSTEM". The disclosure of each of the above applications is incorporated by reference herein as if fully set forth in its entirety.

FIELD

The present disclosure relates generally to power transfer systems configured to control the distribution of drive torque from a powertrain to front and rear drivelines of four-wheel drive (4WD) and all-wheel drive (AWD) motor vehicles. More specifically, the present disclosure is directed to a drive axle assembly equipped with a torque transfer coupling having a pumpless lubrication system.

BACKGROUND

This section provides background information related to the present disclosure which is not necessarily prior art.

In view of increased consumer demand for four-wheel drive (4WD) and all-wheel drive (AWD) motor vehicles, a large number of power transfer systems are currently utilized in vehicular applications for selectively and/or automatically transmitting rotary power (i.e., drive torque) from the powertrain to all four wheels. In most power transfer systems, a power transfer assembly is used to deliver drive torque from the powertrain to one or both of the primary and secondary drivelines. The power transfer assembly is typically equipped with a torque transfer coupling that can be selectively actuated to shift operation of the power transfer system from a two-wheel drive mode into a four-wheel drive mode. In the two-wheel drive mode, drive torque is only transmitted to the primary driveline while drive torque can be transmitted to both of the primary and secondary drivelines when the vehicle is operating in the four-wheel drive mode.

In most 4WD vehicles, the power transfer assembly is a transfer case arranged to normally transmit drive torque to the rear driveline and selectively/automatically transfer drive torque through the torque transfer coupling to the front driveline. In contrast, in most AWD vehicles, the power transfer assembly is a power take-off unit (PTU) arranged to normally permit drive torque to be transmitted to the front driveline and to selectively/automatically transfer drive torque through the torque transfer coupling to the rear driveline.

Many power transfer assemblies are equipped with an adaptively-controlled torque transfer coupling to provide an "on-demand" power transfer system operable for automatically biasing the torque distribution ratio between the primary and secondary drivelines, without any input or action on the part of the vehicle operator, when traction is lost at the primary wheels. Modernly, such adaptively-controlled torque transfer couplings are equipped with a multi-plate clutch assembly and a power-operated clutch actuator that is interactively associated with an electronic traction control system having a controller unit and a plurality of vehicle sensors. During normal operation, the clutch assembly is maintained in a released condition so as to transmit drive torque only to the primary wheels and establish the two-wheel drive mode. However, upon detection of conditions indicative of a low traction condition, the power-operated clutch actuator is actuated to frictionally engage the clutch assembly and deliver a portion of the total drive torque to the secondary wheels, thereby establishing the four-wheel drive mode.

In virtually all AWD power transfer systems of the type noted above, the secondary driveline is configured to include a propshaft, a drive axle assembly equipped with the torque transfer coupling, and one or more constant velocity universal joints. Typically, the opposite ends of the propshaft are drivingly interconnected via the constant velocity universal joints to a rotary output of the power take-off unit and to a rotary input of the torque transfer coupling associated with the drive axle assembly. In most instances, a rotary output associated with the torque transfer coupling is a hypoid gearset configured to transmit drive torque to a differential gear mechanism associated with the drive axle assembly. The torque transfer coupling also includes a multi-plate friction clutch assembly disposed between the rotary input and the rotary output. The differential gear mechanism may include a differential carrier rotatably supported in an axle housing by a pair of laterally-spaced differential bearings and which drives at least one pair of bevel pinions which, in turn, are commonly meshed with first and second output bevel gears. The first and second output bevel gears of the differential gear mechanism are drivingly connected to corresponding first and second axleshafts which, in turn, drive the secondary wheels. The hypoid gearset includes a pinion gear meshed with a ring gear. The pinion gear is typically formed integrally with, or fixed to, a solid pinion shaft that is also rotatably support in the axle housing. Due to the axial thrust loads transmitted through the hypoid gearset, it is common to utilize at least two laterally-spaced tapered pinion bearing to support the pinion shaft for rotation relative to the axle housing.

As is known, a lubrication system is required in association with the drive axle assembly to lubricate and cool the clutch pack of the multi-plate friction clutch assembly and the differential and pinion bearings. In many arrangements, a combination of splash lubrication (generated via rotation of the hypoid gearset) and pumped lubrication (generated via an oil pump) is used to provide adequate system lubrication. The pumped lubrication typically requires either a mechanically-actuated gear pump or an electrically-actuated oil pump to provide the required lubrication for the multi-plate clutch assembly. Obviously, use of mechanical and/or electrical fluid pumps increase the overall cost and packaging requirements of the drive axle assembly as well as possibly lowering its efficiency. Likewise, splash lubrication of the clutch assembly would require rotating components through an oil sump, also reducing efficiency and increasing system drag while requiring a larger volume of lubricant and causing difficulty in accurately directing lubricant flow to the clutch assembly due to centrifugal forces working against the lubricant.

While such conventional drive axle assemblies and pinion shaft support arrangements are adequate for their intended purpose, a need still exists to advance the technology and structure of such products to provide enhanced configurations that provide improved efficiency, reduced weight, packaging requirements, and enhanced lubrication.

SUMMARY

This section provides a general summary of the disclosure and should not be interpreted as a complete and comprehensive listing of all of the objects, aspects, features and advantages associated with the present disclosure.

In accordance with the presented disclosure, a power transfer assembly for a motor vehicle having a powertrain and a pair of wheels is provided. The power transfer assembly comprises a housing with a rotary input driven by a powertrain and further includes a tubular input shaft rotatably supported by the housing. A rotary output is rotatably supported by the housing and is drivingly connected to the pair of wheels. A hypoid gearset is rotatably supported by the housing and includes a ring gear that drives the rotary output and a hollow pinion unit that defines a pinion gear segment meshed with the ring gear and a pinion shaft segment. A torque transfer coupling is operably disposed between the input shaft and the pinion shaft segment of the pinion unit. The power transfer assembly further includes a pumpless lubrication system that includes a collector unit configured to capture lubricant splashed via rotation of one or both the ring gear and the pinion gear segment. The collector unit collects the splashed lubricant in a collection reservoir. A conduit unit is in fluid communication with the collection reservoir and arranged to transmit the lubricant collected in the collection reservoir through an internal pinion chamber formed through the hollow pinion unit in order to lubricate the torque transfer coupling.

In accordance with these and other objects, the torque transfer coupling includes a multi-plate clutch assembly having a first clutch member driven by the input shaft and second clutch member driving the pinion unit. A clutch pack of alternating first and second clutch plates is operably disposed between the first and second clutch members. The lubricant transmitted through the pinion chamber via the conduit unit is directed to lubricate and cool the clutch pack. The input shaft defines an internal shaft chamber communicating with the pinion chamber and includes lubrication bores providing fluid communication between the shaft chamber and the clutch pack.

In accordance with one embodiment of the present disclosure, the collector unit is fixed to the housing and surrounds a portion of the ring gear. As such, the collector unit captures lubricant splashed from rotation of the ring gear. The collector unit includes a collector plate segment arranged in proximity to the ring gear and a collector reservoir segment defining the collection reservoir for holding collected lubricant. A connector segment is in fluid communication with the collection reservoir and the conduit unit is attached to the connector segment of the collector unit and directs lubricant from the collection reservoir to the shaft chamber.

In accordance with an additional embodiment of the present disclosure, the power transfer assembly further includes an auger that is fixed for rotation with the pinion unit and disposed in the pinion chamber. In operation, the rotating auger directs lubricant from the collection reservoir into the shaft chamber.

Further areas of applicability will become apparent from the detailed description provided herein. The specific embodiments and examples set forth in this summary are intended for purposes of illustration only and are not intended to limit the scope of the present disclosure.

DRAWINGS

The drawings described herein are only provided to illustrate selected non-limiting embodiments and are not intended to limit the scope of the present disclosure. According to the following:

FIGS. 7A and 7B are sectional views of an integrated pinion/bearing/coupling (PBC) assembly adapted for use with any of the previously-noted power transfer systems and which is constructed in accordance with the teachings of the present disclosure, while

DETAILED DESCRIPTION

Figure 1:
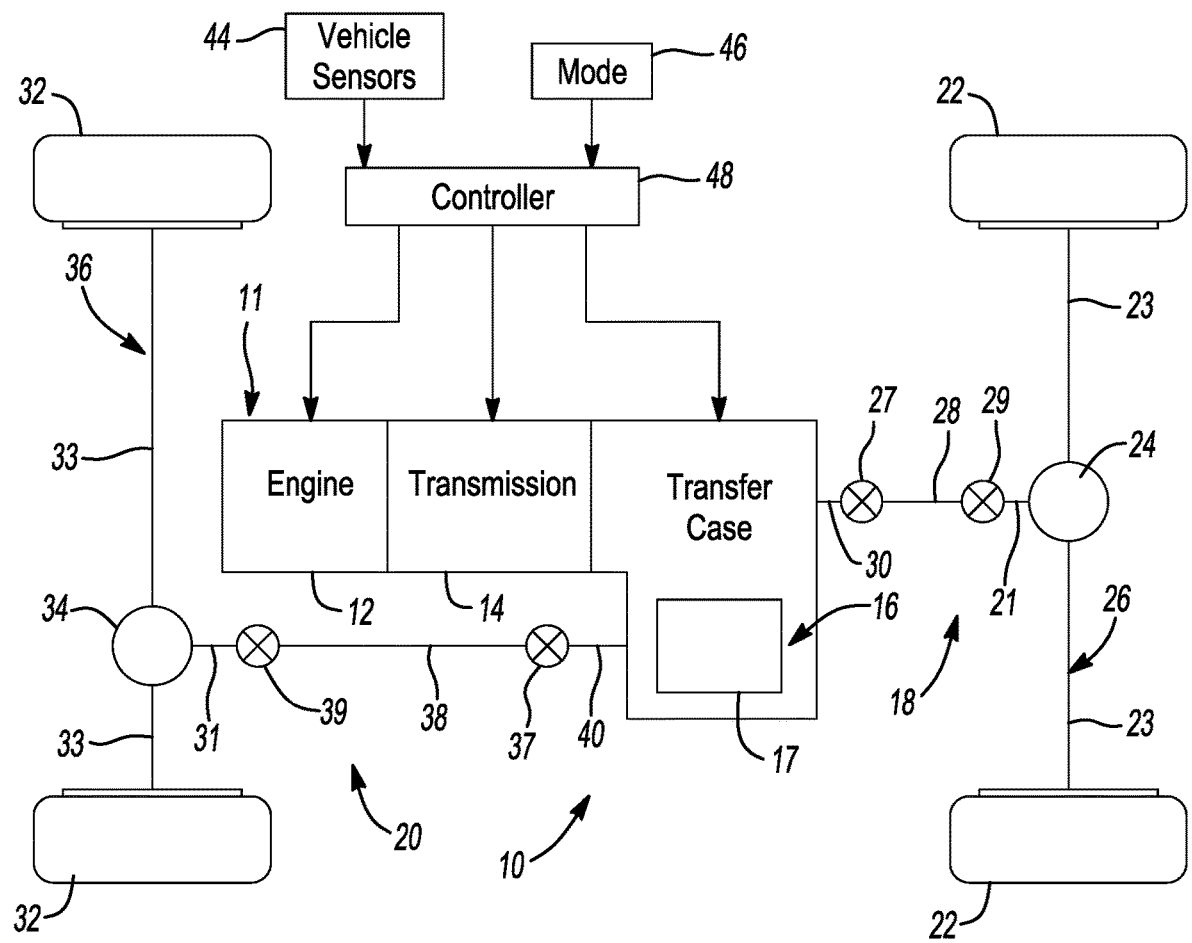
FIG. 1 is a schematic view of a four-wheel drive (4WD) motor vehicle equipped with a power transfer system having one or more products and/or assemblies embodying the teachings of the present disclosure.

Example embodiments will now be described more fully with reference to the accompanying drawings. The example embodiments are provided so that this disclosure will be thorough, and will fully convey the scope of the present disclosure to those who are skilled in the art. In particular, various examples of different power transfer systems for motor vehicles will be described to which products and/or assemblies embodying the teachings of the present disclosure are well-suited for use. To this end, various power transfer assemblies including, without limitations, transfer cases, power take-off units, drive axle assemblies, torque transfer coupling, and differentials are disclosed which can be equipped with a hypoid gearset having an pumpless lubrication system constructed in accordance with the teachings of the present disclosure. However, numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "compromises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below.

Referring initially to FIG. 1, an example of a four-wheel drive (4WD) power transfer system for a motor vehicle 10 is shown. Motor vehicle 10 includes a powertrain 11 operable for generating and transmitting rotary power (i.e. drive torque) to a first or primary driveline 18 and a second or secondary driveline 20. Powertrain 11 is shown in this non-limiting example to include an internal combustion engine 12 and a transmission 14. Primary driveline 18, hereinafter identified as the rear driveline, includes a pair of ground-engaging rear wheels 22 that are interconnected via a pair of rear axleshafts 23 to a rear differential assembly 24 as part of a rear drive axle assembly 26. Secondary driveline 20, hereinafter identified as the front driveline, includes a pair of ground-engaging front wheels 32 that are interconnected via a pair of front axleshafts 33 to a front differential assembly 34 defining a front drive axle assembly 36.

The power transfer system also includes a power transfer assembly, shown in FIG. 1 as a transfer case 16, configured to receive drive torque from powertrain 11 and transmit this drive torque permanently to rear driveline 18 and selectively/automatically to front driveline 20. Transfer case 16 generally includes a rear output shaft 30, a torque transfer coupling 17, and a front output shaft 40. A first end of a rear propshaft 28, also associated with rear driveline 18, is shown drivingly connected via first joint coupling 27 to rear output shaft 30. A second end of rear propshaft 28 is shown drivingly coupled via a second joint coupling 29 to an input component 21 of rear axle assembly 26. Typically, input component 21 is a pinion shaft driving a pinion gear that is meshed with a ring gear, and which together define a rear hypoid gearset. The ring gear drives rear differential assembly 24. As such, rear propshaft 28 is configured to transmit drive torque from rear output shaft 30 of transfer case 16 to rear axle assembly 26. Similarly, a first end of a front propshaft 38 associated with front driveline 20 is shown drivingly connected via a first front joint coupling 37 to front output shaft 40. A second end of front propshaft 38 is shown drivingly connected via a second front joint coupling 39 to a front input component 31 of front axle assembly 36.

Typically, front input component 31 is a pinion shaft driving a pinion gear that is meshed with a ring gear, and which together define a front hypoid gearset. The ring gear drives front differential assembly 34. Thus, front propshaft 38 is configured to transmit drive torque from front output shaft 40 of transfer case 16 to front axle assembly 36.

Figure 2:
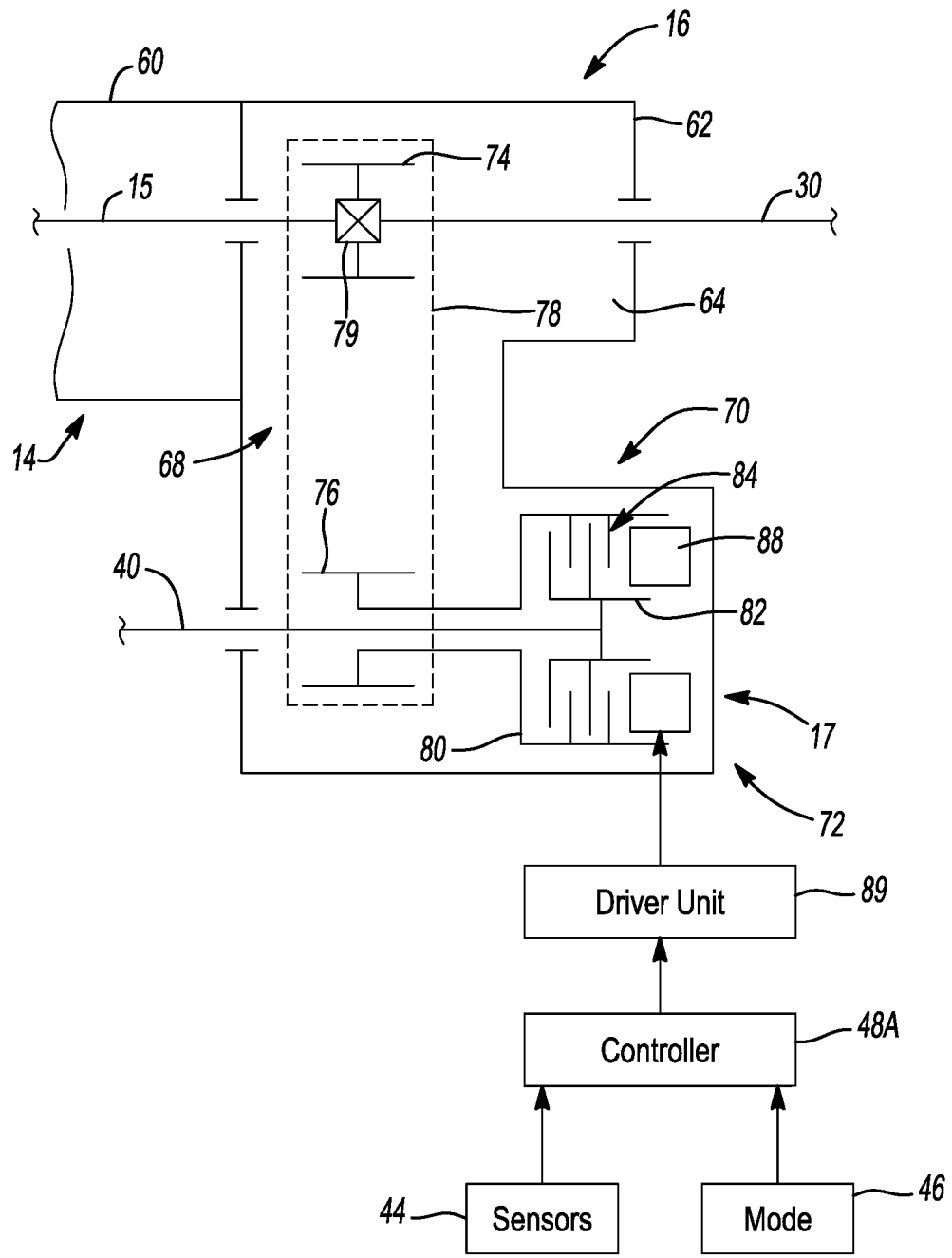
FIG. 2 is a diagrammatical illustration of a power transfer assembly, embodied as a transfer case, associated with the 4WD power transfer system shown in FIG. 1.

Referring now to FIG. 2, a non-limiting example of single-speed transfer case 16 will be described. In the arrangement shown, transmission 14 includes a transmission output shaft 15 extends from a transmission housing 60 into a transfer case housing 62 that is adapted to be secured to transmission housing 60 and which defines an internal chamber 64. Transmission shaft 15 is coupled for common rotation with rear output shaft 30. Transfer case 16 is shown in FIG. 2 to further include a transfer assembly 68 and torque transfer coupling 17 is shown configured to include a clutch assembly 70 and a power-operated clutch actuator 72. Transfer assembly 68 can be configured as a geared drive assembly or as a chain drive assembly. In the particular example disclosed, transfer assembly 68 is a chain drive assembly having a first sprocket 74 drivingly coupled to rear output shaft 30, a second sprocket 76 rotatably supported on front output shaft 40, and a continuous power chain 78 encircling and meshing with both first sprocket 74 and second sprocket 76. A coupling interface 79 is schematically shown for indicating a drive coupling between first sprocket 74 and rear output shaft 30.

Clutch assembly 70 is shown as a multi-plate friction clutch having a first clutch member 80 coupled for rotation with second sprocket 76, a second clutch member 82 coupled for rotation with front output shaft 40, and a multi-plate clutch pack 84 comprised of a plurality of interleaved inner and outer clutch plates. The inner clutch plates are coupled to second clutch member 82 while the outer clutch plates are coupled to first clutch member 80. Power-operated clutch actuator 72 includes an axially moveable apply device 88 capable of applying a compressive clutch engagement force on clutch pack 84, and a powered driver unit 89 operable for controlling the axial position of apply device 88 relative to clutch pack 84. For example, and without limitations, apply device 88 could include a rotary-to-linear conversion device such as a ballramp unit while powered driver unit 89 could include an electric motor and geartrain assembly configured to control actuation of the ballramp unit.

The magnitude of the clutch engagement force exerted on clutch pack 84 is proportional to the amount of drive torque transmitted from rear output shaft 30 through transfer assembly 68 to front output shaft 40. Accordingly, when a predetermined minimum clutch engagement force is applied to clutch pack 84, a minimum amount of drive torque is transmitted to front driveline 20. In contrast, when a predetermined maximum clutch engagement force is applied to clutch pack 84, a maximum amount of drive torque is transmitted to front driveline 20. As such, adaptive control over the front/rear drive torque distribution ratio can be provided by actively controlling operation of torque transfer coupling 17 within transfer case 16 to establish a two-wheel drive (2WD) mode and an on-demand four-wheel drive (4WD) mode. FIG. 2 also illustrates a transfer case controller unit 48A associated with vehicle controller 48 of FIG. 1 that is operable for controlling actuation of powered driver unit 89 in response to signals from sensors 44 and/or mode selector 46 and which, in turn, controls the axial position of apply device 88 relative to clutch pack 84.

Figure 3:
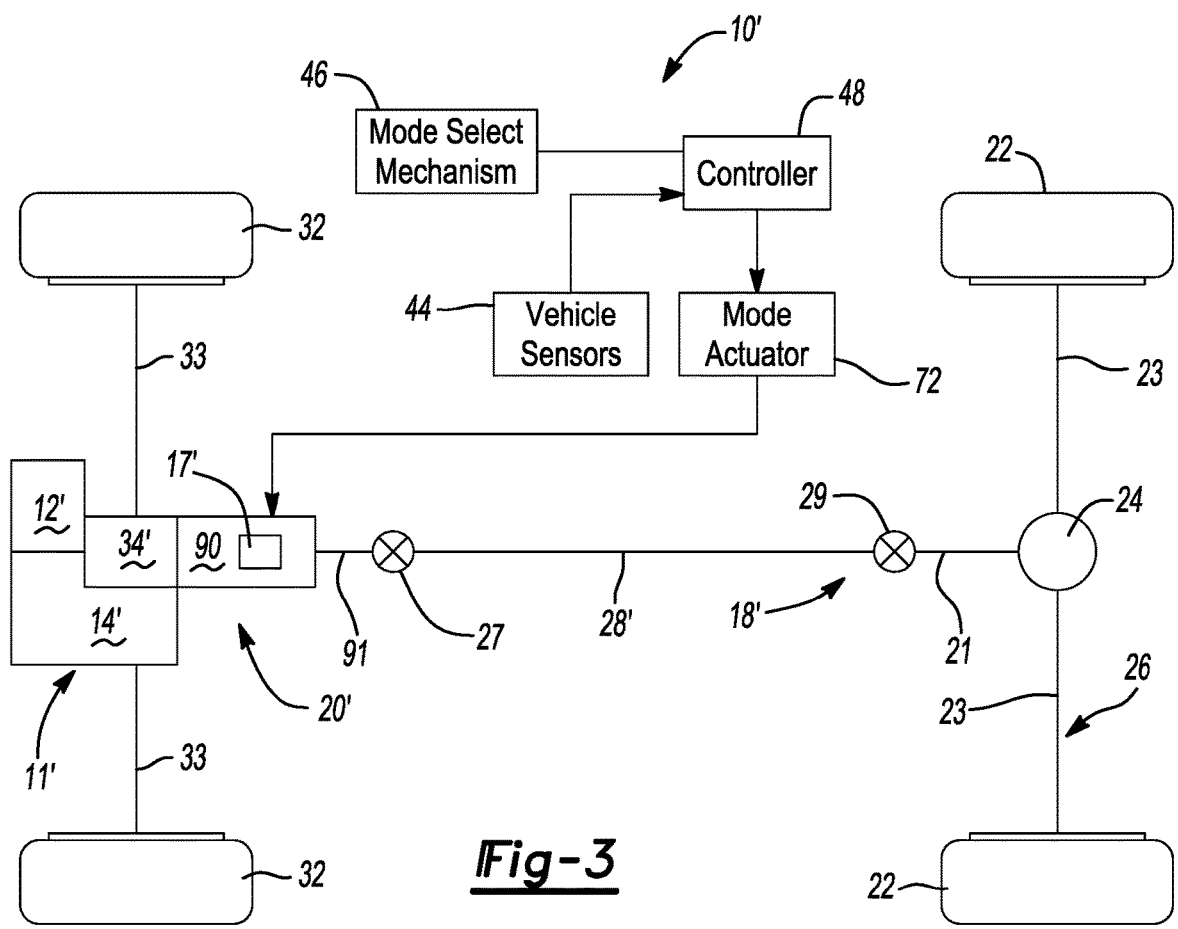
FIG. 3 is schematic view of an all-wheel drive (AWD) motor vehicle equipped with a power transfer system having one or more products and/or assemblies embodying the teachings of the present disclosure.

Referring now to FIG. 3, an example of an all-wheel drive (AWD) power transfer system for a motor vehicle 10' is shown. Motor vehicle 10' includes a powertrain 11' comprised of an engine 12' and a transmission 14'. The primary driveline, in this non-limiting example, is front driveline 20' while the secondary driveline is rear driveline 18'. Drive torque from powertrain 11' is normally transmitted through a front differential assembly 34' to front wheels 32 via front axleshafts 33. As seen, the first end of a rear propshaft 28' is drivingly interconnected via first joint coupling 27 to an output component 91 of a power transfer assembly, hereinafter referred to as power take-off unit (PTU) 90. Furthermore, the second end of rear propshaft 28' is drivingly connected via second joint coupling 29 to rotary input 21 of rear axle assembly 26. PTU 90 is equipped with a torque transfer coupling 17' operable for selectively transmitting drive torque from powertrain 11' to rear driveline 18'.

Figure 4:
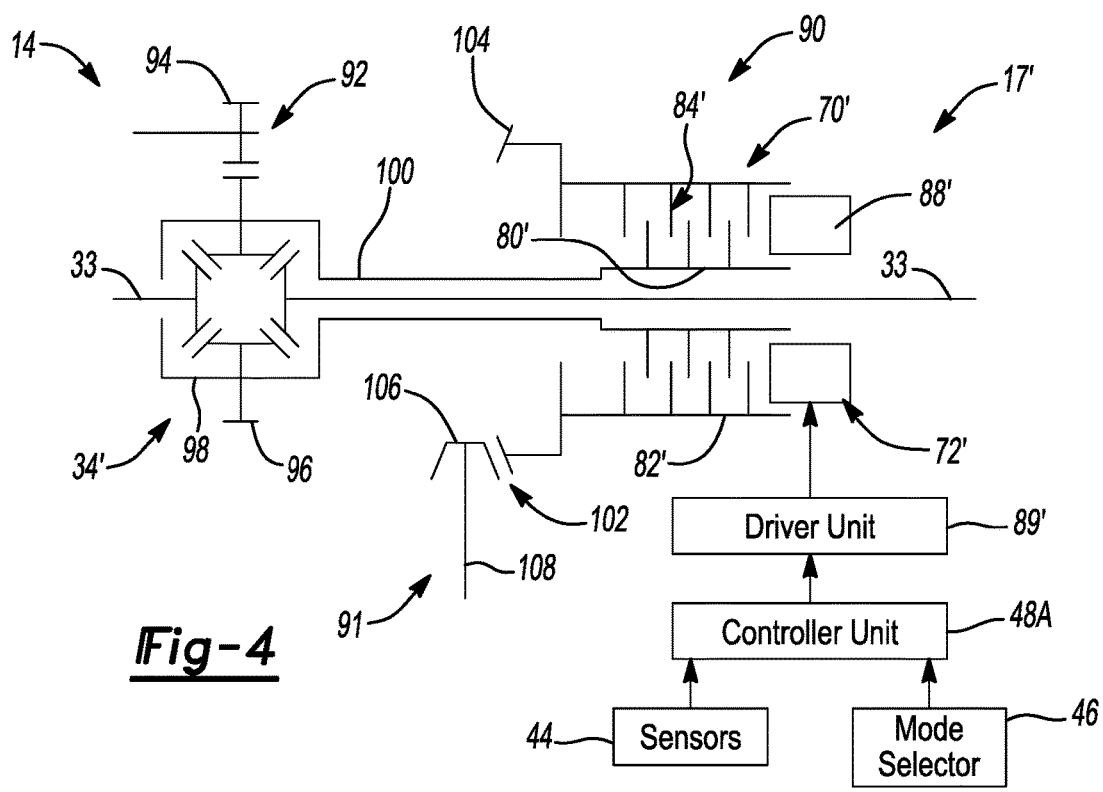
FIG. 4 is a diagrammatical illustration of a power transfer assembly, embodied as a power take-off unit, associated with the AWD power transfer system shown in FIG. 3.

FIG. 4 diagrammatically illustrates a non-limiting example of PTU 90. A final drive gearset 92 of transmission 14' includes an output gear 94 driving a ring gear 96 fixed to a differential carrier 98 of front differential assembly 34'. PTU 90 includes an input shaft 100 driven by gearset 92 or carrier 98, a hypoid gearset 102, and torque transfer coupling 17' disposed therebetween. Hypoid gearset 102 includes a crown gear 104 meshed with a pinion gear 106 which, in turn, is drivingly connected to a pinion shaft 108 which acts as output component 91. Torque transfer coupling 17' includes a clutch assembly 70' and a power-operated clutch actuator 72'. Clutch assembly 70' is a multi-plate friction clutch having a first clutch member 80' coupled to input shaft 100, a second clutch member 82' coupled to crown gear 104, and a multi-plate clutch pack 84'. Multi-plate clutch pack 84' includes inner clutch plates coupled to first clutch member 80' which are alternately interleaved with outer clutch plates coupled to second clutch member 82'.

Power-operated clutch actuator 72' includes an axially-moveable apply device 88' capable of applying a compressive clutch engagement force on clutch pack 84', and a powered driver unit 89' operable for controlling the axial position of apply device 88' relative to clutch pack 84'. The magnitude of the clutch engagement force applied to clutch pack 84' is proportional to the amount of drive torque transmitted from input shaft 100 through clutch assembly 70' and hypoid gearset 102 to rear propshaft 28'. Thus, when a minimum clutch engagement force is applied to clutch pack 84', a minimum drive torque is transmitted via hypoid gearset 102 to rear driveline 18'. In contrast, when a maximum clutch engagement force is applied to clutch pack 84', a maximum drive torque is transmitted to rear driveline 18'. As such, active control over the front/rear torque distribution ratio is provided. This allows establishment of the above-noted 2WD and on-demand 4WD modes of operation for vehicle 10'.

Figure 5:
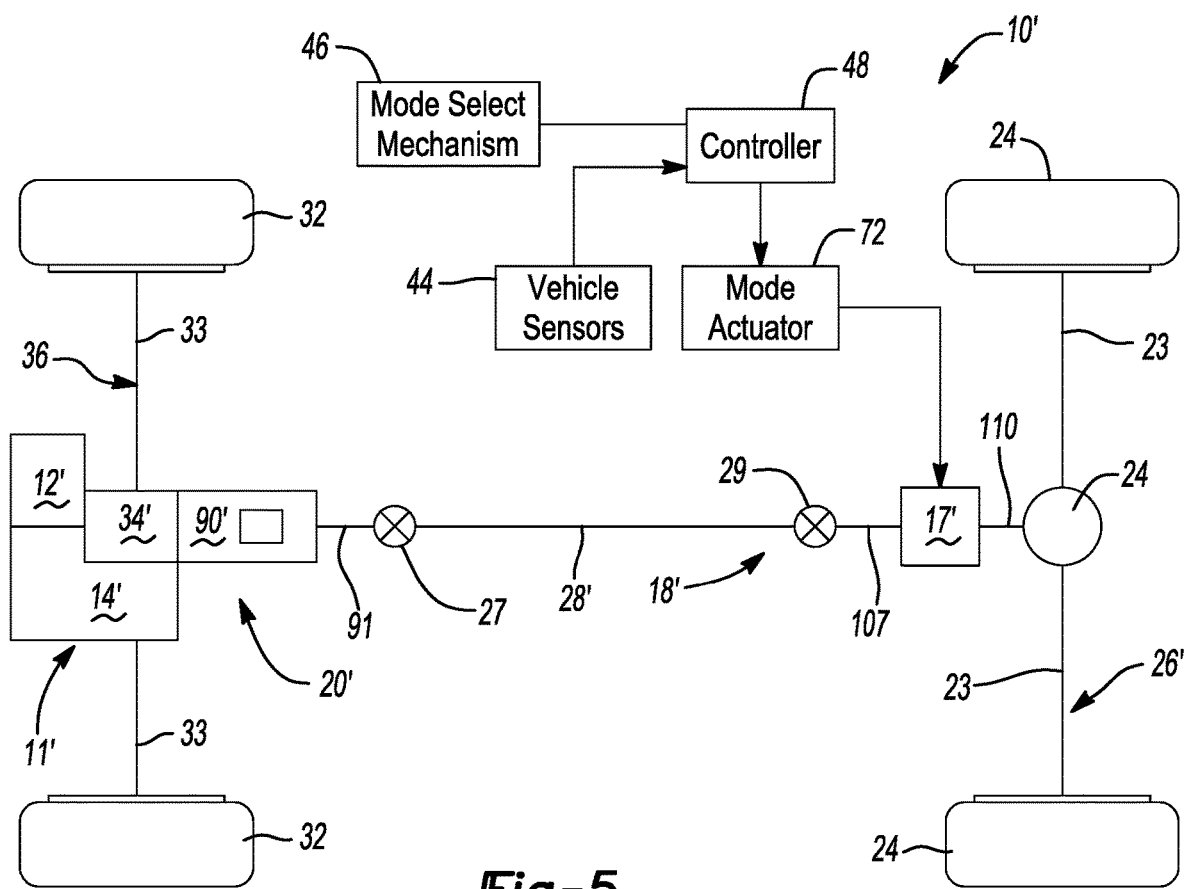
FIG. 5 is a diagrammatical view of an alternative version of the all-wheel drive vehicle shown in FIG. 3 and which is equipped with an AWD power transfer system having one or more products and/or assemblies embodying the teachings of the present disclosure.
Figure 6:
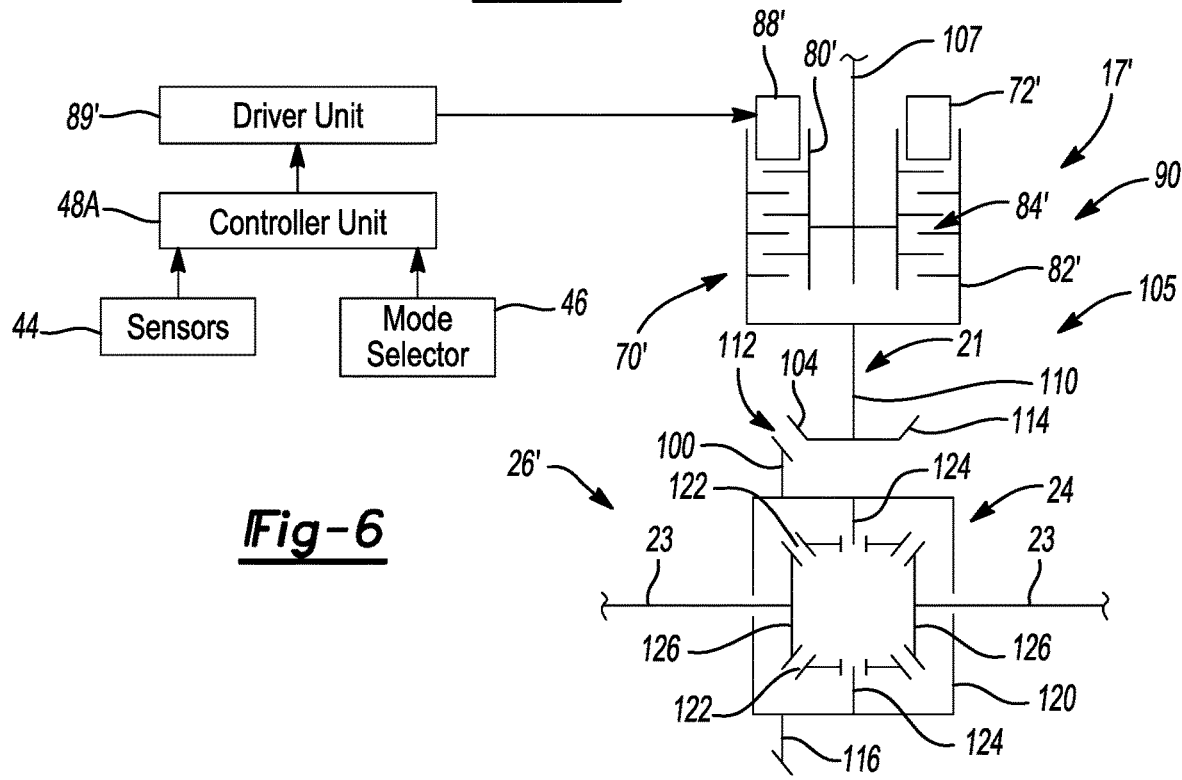
FIG. 6 is a schematic view of a power transfer assembly, embodied as a drive axle assembly equipped with torque transfer coupling, associated with AWD power transfer system shown in FIG. 5.

Referring now to FIGS. 5 and 6, a revised version of AWD motor vehicle 10' is now shown with torque transfer coupling 17' removed from PTU 90' and now operably disposed between rear propshaft 28' and a rear axle assembly 26'. Torque transfer coupling 17' is preferably mounted within an extended portion of the axle housing (not shown) to define a power transfer assembly referred to as a rear axle drive (RAD) assembly 105. As such, PTU 90' is configured with input shaft 100 driving crown gear 104 of hypoid gearset 112 such that pinion gear 106 drives rear propshaft 28' via coupling unit 27. RAD assembly 105 is a revised version of rear drive axle assembly 26 and generally includes rear differential assembly 24, a hypoid gearset 112 driving rear differential assembly 24, and torque transfer coupling 17' disposed between a coupling shaft 107 and a pinion shaft 110. Coupling shaft 107 is connected to the second end of rear propshaft 28' via second coupling joint unit 29. Clutch assembly 70' is shown with first clutch member 80' fixed to coupling shaft 107 while pinion shaft 110 is fixed to second clutch member 82'.

Hypoid gearset 112 includes a pinion gear 114 meshed with a ring gear 116. Pinion gear 114 is fixed to pinion shaft 110 while ring gear 116 is fixed for rotation with a differential carrier 120 of rear differential assembly 24. Rear differential assembly 24 is shown to also include a pair of differential pinions 122 rotatably mounted on crosspins 124 that are fixed to differential carrier 120. Output gears 126 are meshed with differential pinions 122 and are drivingly connected to axleshafts 23. Actuation of power-operated clutch actuator 72' functions to control the amount of drive torque transmitted from powertrain 11' through PTU 90', rear propshaft 28' and clutch assembly 70' to hypoid gearset 112 for driving rear axle assembly 26'.

The above configurations are clearly illustrated to incorporate a hypoid gearset into one or more products and/or assemblies associated with rear axle assembly 26, 26', front axle assembly 36, torque transfer device 17', PTU 90, 90' and/or RAD assembly 105. Accordingly the following detailed description of various embodiments of the present disclosure is sufficient to provide one skilled in this art an understanding and appreciation of the structure and function of the following.

Figure 7A:
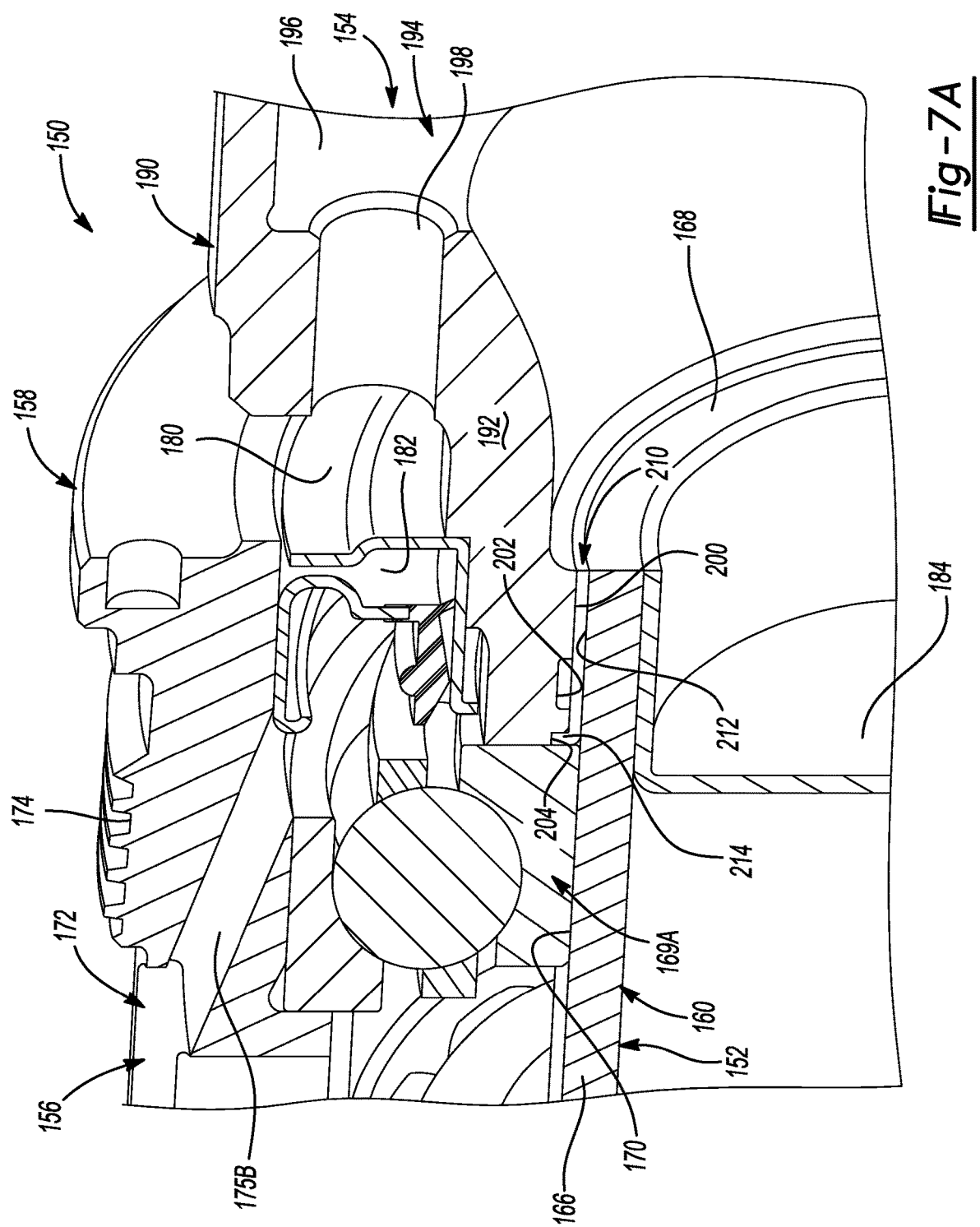
Figure 7C:
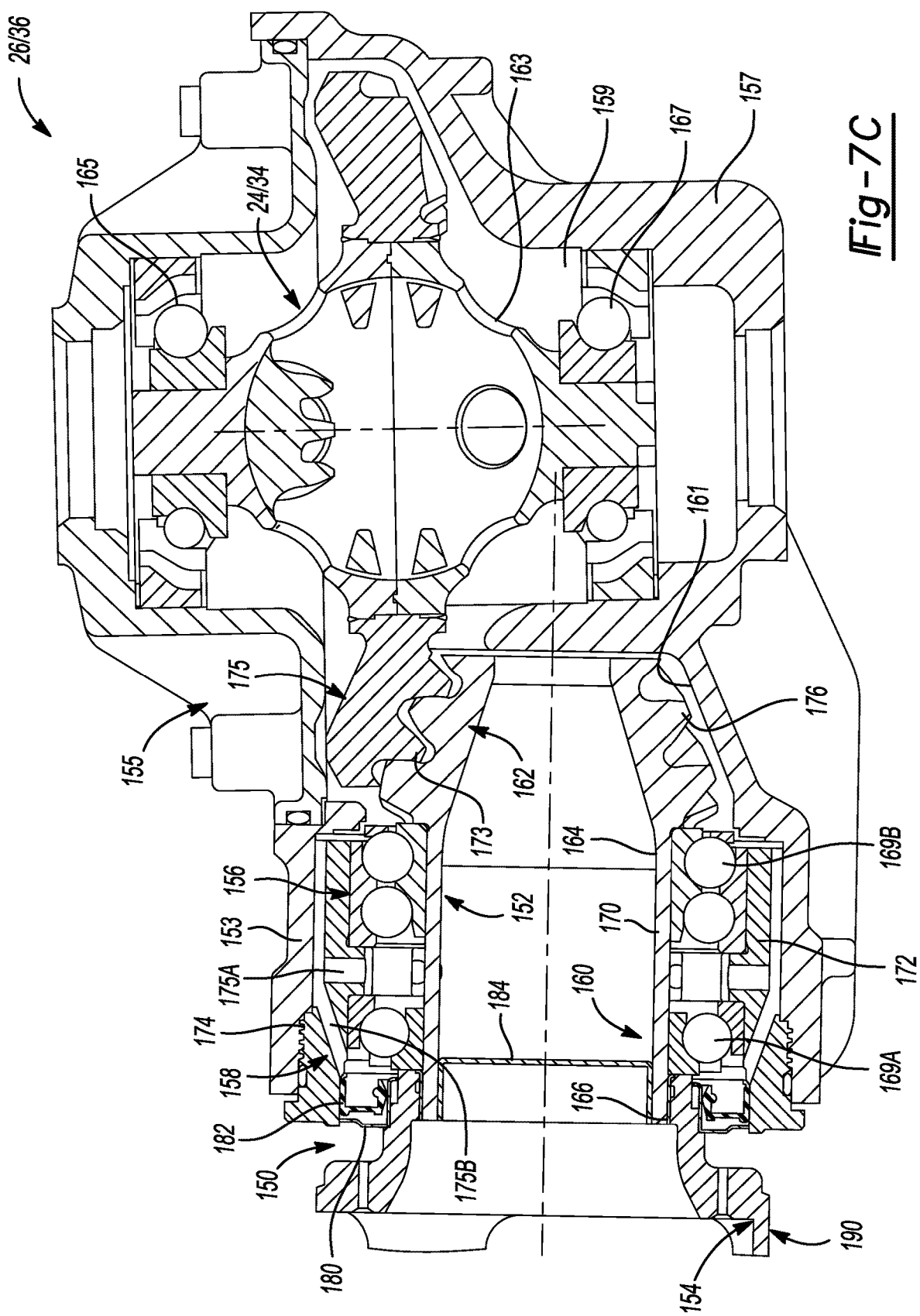
FIG. 7C is a sectional view of a drive axle assembly equipped with the PBC assembly.
Figure 8:
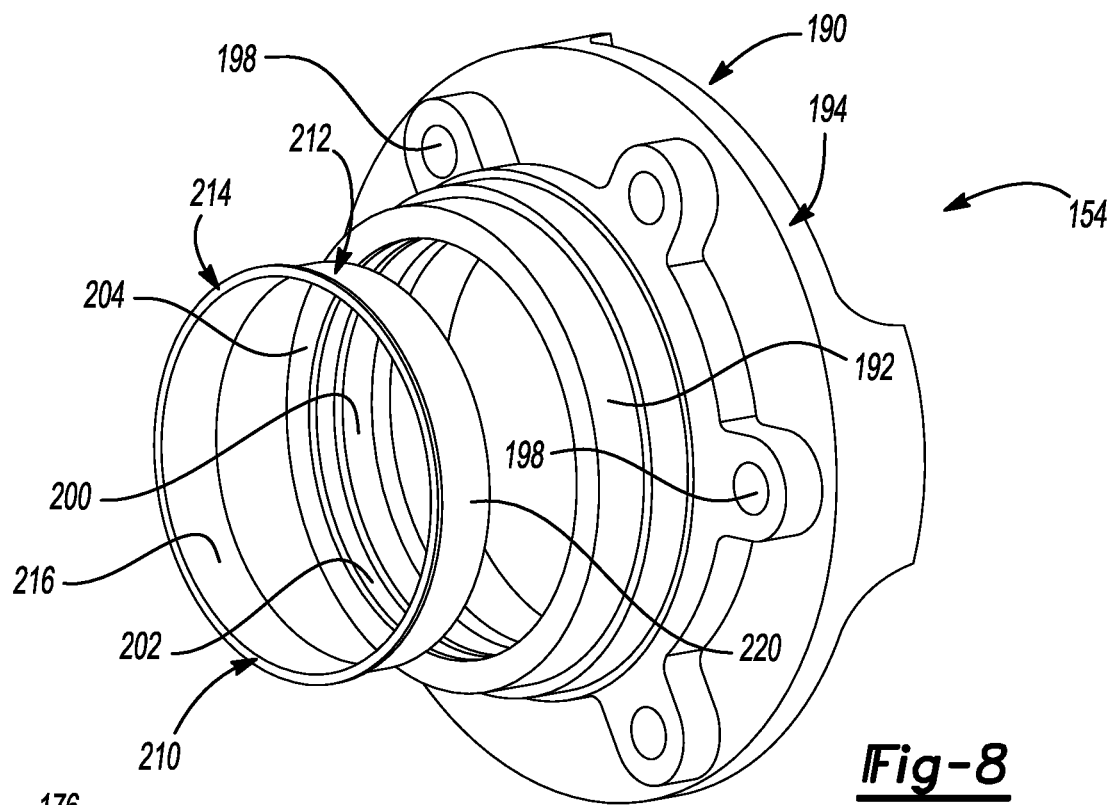
FIG. 8 is an exploded isometric view showing an intermediate sleeve and an aluminum flange plate associated with a mounting system for the PBC assembly shown in FIG. 7.
Figure 9:
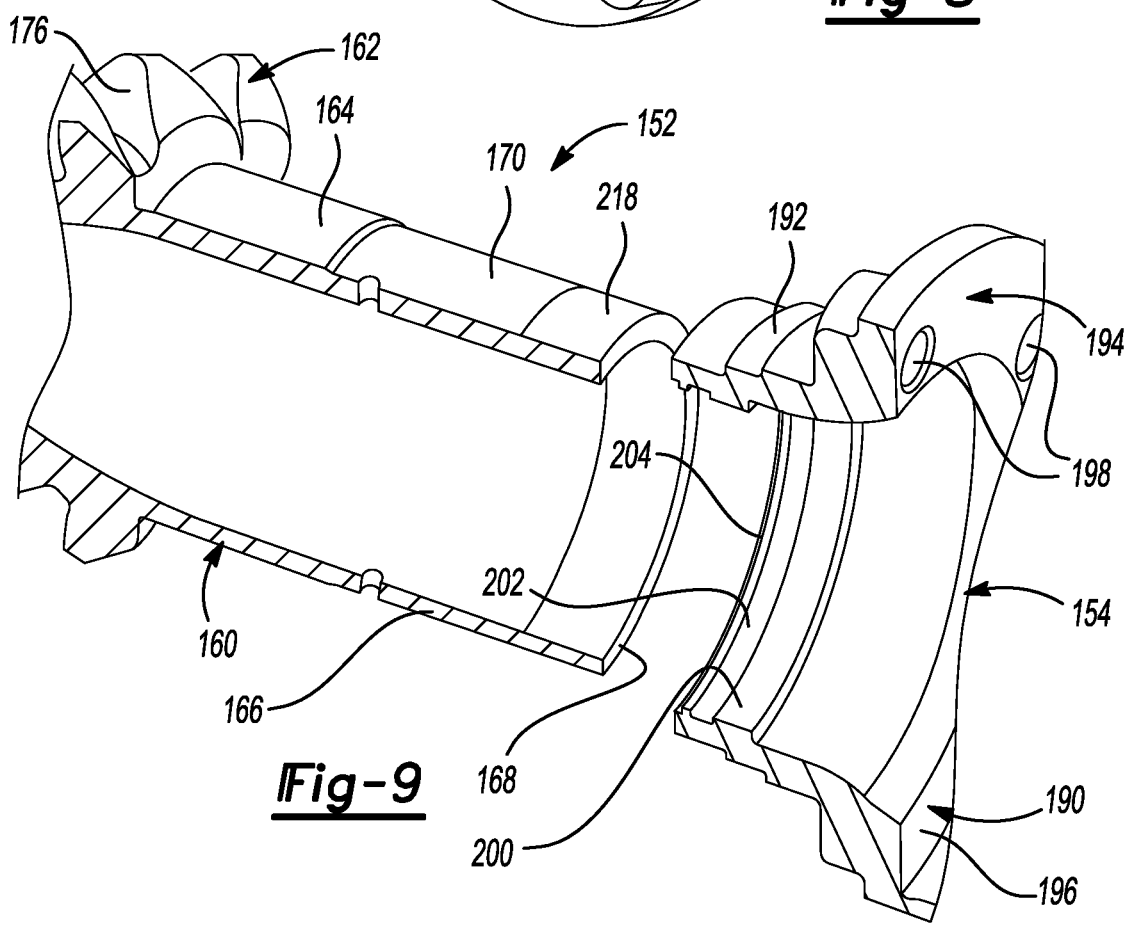
FIG. 9 is an exploded isometric view showing a steel pinion shaft and the aluminum flange plate for the mounting system associated with the PBC assembly shown in FIG. 7.

Referring now to FIGS. 7 through 9, an integrated pinion/bearing/coupling arrangement, hereinafter referred to as a PBC assembly 150, is shown to generally include a pinion unit 152, a coupler unit 154, a bearing unit 156, and a threaded lock collar unit 158. Pinion unit 152 is configured as a hollow steel component (preferably forged) having a tubular pinion shaft segment 160 and a tubular pinion gear segment 162. While shaft segment 160 and gear segment 162 are shown to be integrally formed as a homogeneous steel component, it will be understood that pinion gear segment 162 can alternatively be a separate hollow component (made of different material) that is rigidly secured to a first end of pinion shaft segment 160. Shaft segment 160 has a first end portion 164 from which gear segment 162 extends and a second end portion 166 having an end surface 168. Bearing unit 156 includes a pair of laterally-spaced bearing assemblies 169A, 169B that are operably installed between an intermediate portion 170 of pinion shaft segment 160 and a bearing housing 172 configured to be installed in a pinion housing portion 153 of an axle housing 155. Bearing housing 172 functions to axially position bearing assemblies 169A, 169B. As best seen in FIG. 7B, bearing housing 172 includes a radially-inwardly extending cylindrical lug 173 against which the outer races of bearing assemblies 169A, 169B are engaged. Bearing housing 172 further includes fluid ports 175A, 175B provided to facilitate lubrication supply to the bearings.

Lock collar unit 158 is rigidly secured to bearing housing 172 (or formed integrally therewith) and includes external threads 174 provided to permit the axial positioning of PBC assembly 150 to be adjusted relative to pinion housing portion 153 of axle housing 155 for setting desired preload and/or backlash between gear teeth 176 on gear segment 162 of pinion unit 152 and gear teeth 173 on a ring gear 175. A sealing arrangement includes a seal plate 180 fixed to coupler unit 154 and a flexible rotary seal 182 disposed between seal plate 180 and lock collar 158. A grease cap 184 is shown installed within second end portion 166 of shaft segment 160.

FIG. 7C illustrates a version of one of rear drive axle 26, 26' and front drive axle 36 equipped with PBC assembly 150. As shown, axle housing 155 also includes a differential housing portion 157 defining a differential gearset chamber 159 which communicates with a pinion chamber 161 formed in pinion housing portion 153. Differential assembly 24, 34 includes a differential carrier 163 to which ring gear 175 is rigidly secured (i.e. welded) for common rotation. Carrier 163 is rotatably supported in differential housing portion 157 of axle housing 155 via a pair of laterally-spaced differential bearing assemblies 165, 167. A differential gearset is operably installed within differential gearset chamber 159 of carrier 163 and includes a pair of differential pinions rotatably supported on crosspins that are fixed for rotation with carrier 163. The differential gearset further includes a pair of differential output gears each of which is meshed with both differential pinions. As is conventional, the differential output gears are drivingly connected to axleshafts 23/33. The exemplary drive axles are shown to illustrate a hypoid gearset comprised of pinion gear segment 162 and ring gear 175 and further illustrate the advantages associated with PBC assembly 150 to be described hereinafter.

Coupler unit 154 is shown to include a flange plate 190 having a tubular hub segment 192 and a radial disk segment 194. Disk segment 194 has a planar mounting face surface 196 configured to mate with a corresponding coupling component of a joint unit (i.e. constant velocity joint) or with a mounting flange of a propshaft. A plurality of mounting bores 198 are formed through disk segment 194 and are configured to accept threaded fasteners provided for rigidly connecting coupler unit 154 to the corresponding coupling component. Hub segment 192 defines an inner diameter surface 200 having an annular groove 202 formed therein and an end groove 204. Coupler unit 154 is preferably manufactured from aluminum such as, for example, 6000 or 7000 series aluminum and/or aluminum alloys.

Coupler unit 154 is also shown to include an intermediate sleeve, hereinafter referred to as brazing sleeve 210, having a tubular sleeve segment 212 and a raised end flange segment 214. Sleeve segment 212 is configured to include an inner diameter surface 216 sized to rest on an outer diameter surface 218 of second end portion 166 of pinion shaft segment 160, and an outer diameter surface 220 sized to engage surface 200 of hub segment 192. As best seen in FIG. 7A, raised end flange segment 214 of brazing sleeve 210 is configured to be aligned and retained in end groove 204 of hub segment 192 on flange plate 190. Brazing sleeve 210 is preferably made of a copper or copper/brass alloys or zinc/zinc alloys and is adapted to establish a bonded (i.e. brazed) connection between hub segment 192 of aluminum coupler unit 154 and end portion 166 of steel pinion shaft segment 160. Surface 200 of hub segment 192 can be modified prior to the brazing process to form a layer (i.e. zinc or other coating material) to reduce or eliminate intermetallic layer post welding operation.

The arrangement shown in FIGS. 2 through 9 provides a method and configuration for attaching an aluminum flange to a hollow steel pinion shaft while maintaining a desired pinion bearing preload. Specifically, the use of brazing sleeve 210 fabricated from an intermediary material (copper, copper/bronze alloys, zinc/zinc alloys, etc.) facilitates the laser brazing of an aluminum flange to a steel pinion shaft. Brazing of this joint allows for the accurate setting of the pinion bearing preload with the aluminum flange since large diameter hollow gear segment 162 and shaft segment 160 allows for such a joining process since the shear stress at these larger diameters drive by torque is relatively low. This arrangement may also result in elimination of propshaft flange balancing requirements, simplified assembly, and improved preload accuracy with welded/brazed pinion for increased efficiency.

The hollow pinion design was developed specifically to optimize the overall weight of the axle assembly. Traditional axle pinions typically consist of a gear portion and solid stem portion which is supported by bearings. Due to the relatively small diameter of the stem portion and therefore the bearings, the bearings need to be spaced axially apart a certain distance to maintain stiffness or need to incorporate an additional bearing at the head (the gear section) of the pinion. This results in an increased length axle housing. In this application, designing a hollow pinion with a large diameter equal to approximately 50% of its overall length improved mass by over 20%. This design maintains the same stiffness while also improving the stresses within the bearing as the number of balls is increased at this larger diameter. This also allows for use of thinner and lighter bearing assemblies. Torque transfer capability thru the hollow pinion is equivalent to a smaller diameter solid stem pinion due to increased polar moment of inertia. This improved cross section allows the wall thickness to be further optimized for maximum weight savings.

Figure 10:
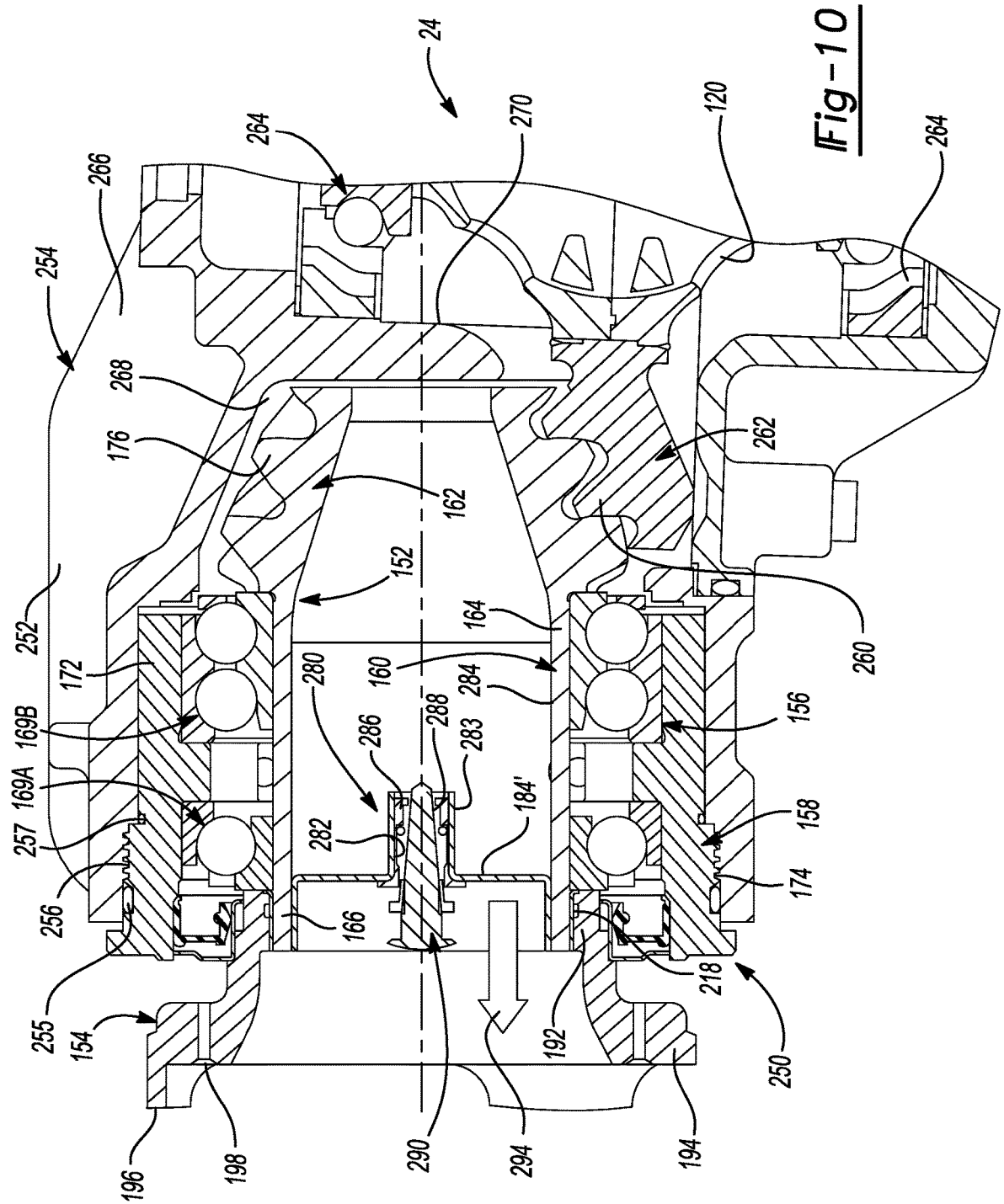
FIG. 10 is a sectional view of an alternative embodiment of a PBC assembly installed in a drive axle assembly and equipped with a venting system arranged to vent air from the differential assembly through the vented PBC assembly.

Referring now to FIG. 10, an alternative version of PBC assembly 150 will be described and hereinafter referred to as "vented" PBC assembly 250. Since vented PBC assembly 250 is generally similar in construction and operation to that of PBC assembly 150, common reference numerals are used to identify those components that are similar to those previously described. In general, vented PBC assembly 250 is adapted to be mounted within a pinion housing portion 252 of an axle housing 254 and includes pinion unit 152, coupler unit 154, bearing unit 156, and threaded lock collar unit 158. Threads 174 on lock collar unit 158 are shown in threaded engagement with internal threads 256 formed in pinion housing portion 252 of axle housing 254. Seal rings 255, 257 are provided between integrated lock collar 158—bearing housing 172 and pinion housing 252. Pinion teeth 176 on gear segment 162 of pinion unit 152 are shown meshed with gear teeth 260 formed on a ring gear 262 which, in turn, is fixed to differential carrier 120 of differential assembly 24. Lateral differential bearing assemblies 264 rotatably support differential carrier 120 on a differential housing portion 266 of axle housing 254. As seen, a pinion chamber 268 formed in pinion housing portion 252 communicates with a differential chamber 270 formed in differential housing portion 266.

Typically, a vent system is provided in association with differential housing portion 266 of axle housing 254 to provide a vent passage between differential chamber 270 and ambient. However, the present disclosure is directed, in this particular embodiment, to a venting system associated with vented PBC assembly 250 to vent air from within differential chamber 270 and/or pinion chamber 268 to atmosphere through a vent assembly 280 that is installed within hollow shaft segment 160 of pinion unit 152. This new and improved venting arrangement permits elimination of conventional differential housing vent systems and provides a sealed arrangement preventing water from being drawn into axle housing 254 upon submerging thereof, thereby meeting OEM "fording" requirements.

With continued referenced to FIG. 10, vent assembly 280 is shown installed in a central aperture 282 formed in a tubular segment 283 of a grease cap 184' mounted to an inner wall surface 284 of second end portion 166 of pinion shaft segment 160. A valve seat ring 286 is installed in central aperture 282 and defines a valve seat opening 288. A spring-loaded plunger 290 is moveable relative to valve seat opening 288 to control the flow of pressurized air from inside hollow pinion unit 152 to atmosphere, as indicated by the arrow 294. Location of vent assembly 280 within pinion unit 152 of PBC assembly 250 provides additional protection in comparison to conventional housing mounted vents since it is now protected from external damage and fouling.

Figure 11:
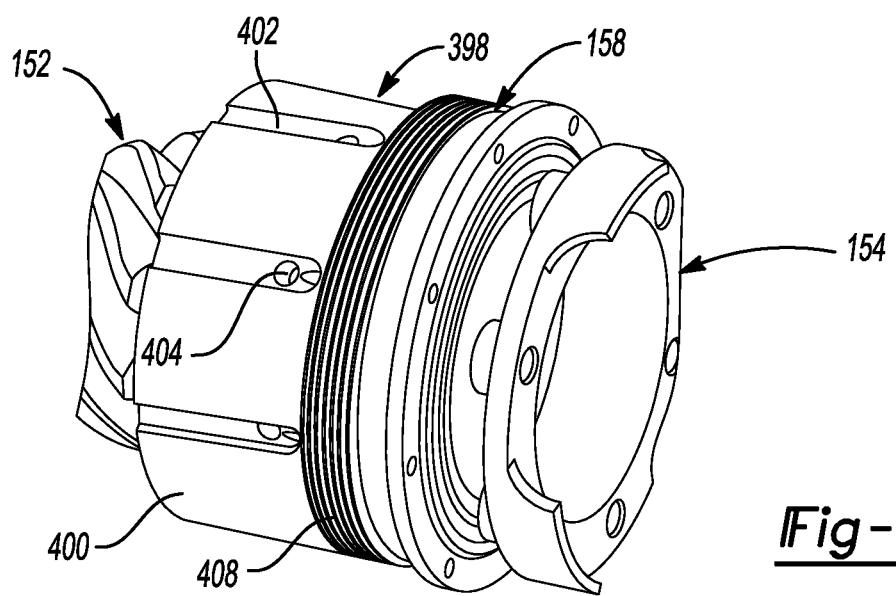
FIG. 11 illustrates an assembled isometric view of another embodiment of a PBC assembly including a threaded pinion cartridge assembly.
Figure 12:
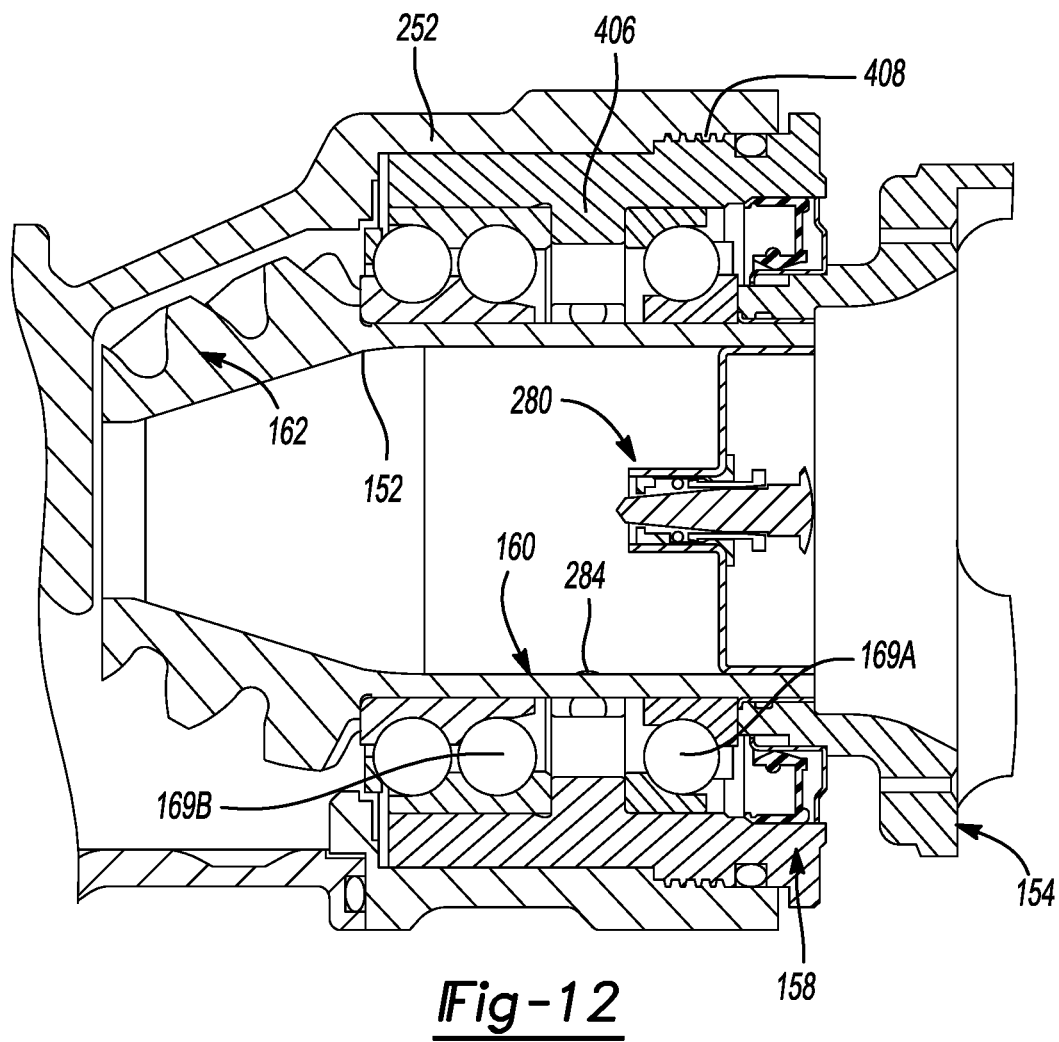
FIG. 12 is a sectional view of the PBC assembly shown in FIG. 11 installed in an axle housing of a drive axle assembly.

FIGS. 11 and 12 better illustrate a cartridge type pinion assembly 398 used in PBC assembly 150 and/or 250. A combined locking collar 158 and bearing housing 172, hereinafter "cartridge" 400, integrates the function of both into a stand-alone assembly. Cartridge 400 has a tubular cartridge section 398 that includes lubrication slots 402 and ports 404 providing lubrication to bearing 169A, 169B while a separator ring 406 maintains spacing therebetween. Threads 408 permit a threaded connection to pinion housing portion of axle housing which, in turn, permits precise axial positioning of the pinion assembly for optimized backlash setting. This threaded arrangement eliminates use of shims, and reduces housing stresses for permitting weight savings.

Figure 13:
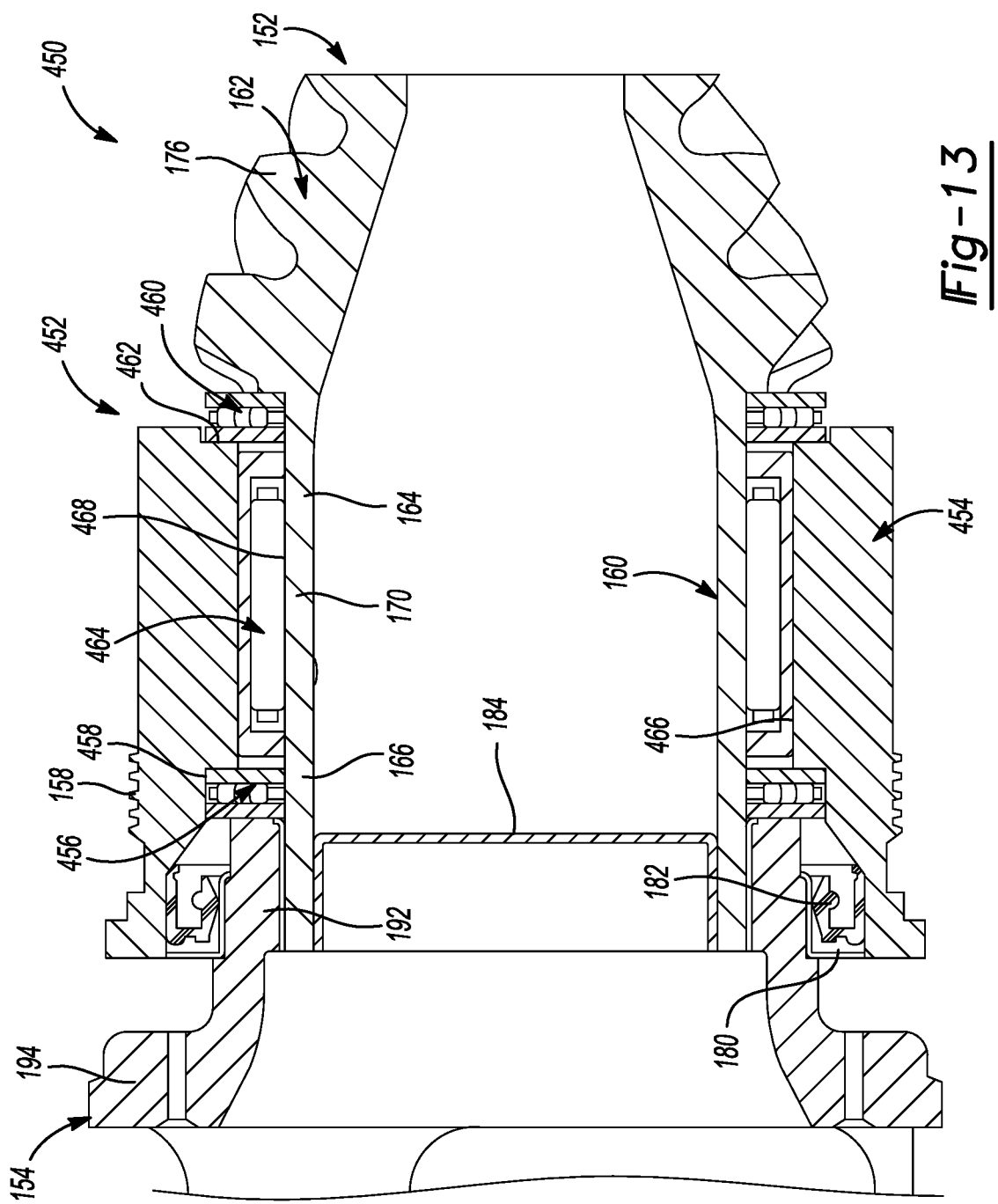
FIG. 13 is a sectional view of a PBC assembly having an alternative bearing arrangement constructed in accordance with the present disclosure.

Referring to FIG. 13, another alternative embodiment of PBC assembly 450 is shown to include pinion unit 152, coupler unit 154, a bearing unit 452 and a threaded cartridge unit 454. Bearing unit 452 is shown to include a first axial thrust needle bearing 456 disposed between a first edge 458 of cartridge 454 and coupler unit 154, a second axial thrust needle bearing 460 disposed between a second edge 462 of cartridge 454 and gear segment 162 of hollow pinion unit 152, and a radial needle bearing 464 disposed between an inner diameter surface 466 of cartridge 454 and an outer diameter surface 468 of intermediate portion 170 of shaft segment 160. Threads 158 on cartridge 454 permits axial adjustment of PBC assembly 450 relative to the pinion housing portion of the axle housing. This arrangement of needle (axial and radial) bearings in place of conventional bearings provides weight reduction while providing equivalent stiffness and reduced drag losses, particularly in combination with a hollow pinion unit.

Referring now to FIGS. 14-17, an alternative version of RAD assembly 105 is shown and hereinafter referred to as ultra-lightweight RAD assembly, or ULRAD assembly 500, and is configured for use in the AWD transfer system shown in FIG. 5. ULRAD assembly 500 generally includes a multi-piece housing 502 supporting rear differential 24, a hypoid gearset 504, a torque transfer coupling 506 and a coupling unit 508. Housing 502 includes an axle housing 510 defining a differential chamber 512 and a pinion chamber 514, a clutch housing 516 defining a clutch chamber 518, and a coupling housing 520 defining a coupler chamber 522. Rear differential 24 is generally similar to the configuration previously described with respect to FIGS. 6 and 7, and includes differential carrier 120 rotatably supported within differential chamber 512 of axle housing 510 via a pair of laterally-spaced differential bearings 165, 167, differential pinions 122 rotatably supported on crosspins 124, and output gears 126 meshed with pinions 122 and drivingly connected to axleshafts 23.

Hypoid gearset 504 includes a ring gear 530 fixed for rotation with differential carrier 120 and a pinion unit 532. Pinion unit 532 is configured as a hollow steel component having a tubular pinion shaft segment 534 and a tubular pinion gear segment 536. Pinion unit 532 is part of a pinion/bearing assembly further including a bearing unit 538 and lock collar unit 540, together installed within pinion chamber 514 of axle housing 510. Bearing unit 538 includes a pair of laterally-spaced bearing assemblies 542, 544 and a bearing housing 546. Lock collar unit 540 is rigidly secured to, or formed integrally with, bearing housing 546 and includes external threads provided to engage internal threads formed on axle housing 510 to facilitate axial adjustment therebetween for setting a desired preload and/or backlash between gear teeth 548 on ring gear 530 and gear teeth 550 on pinion gear segment 536 of pinion unit 532.

Figure 15:
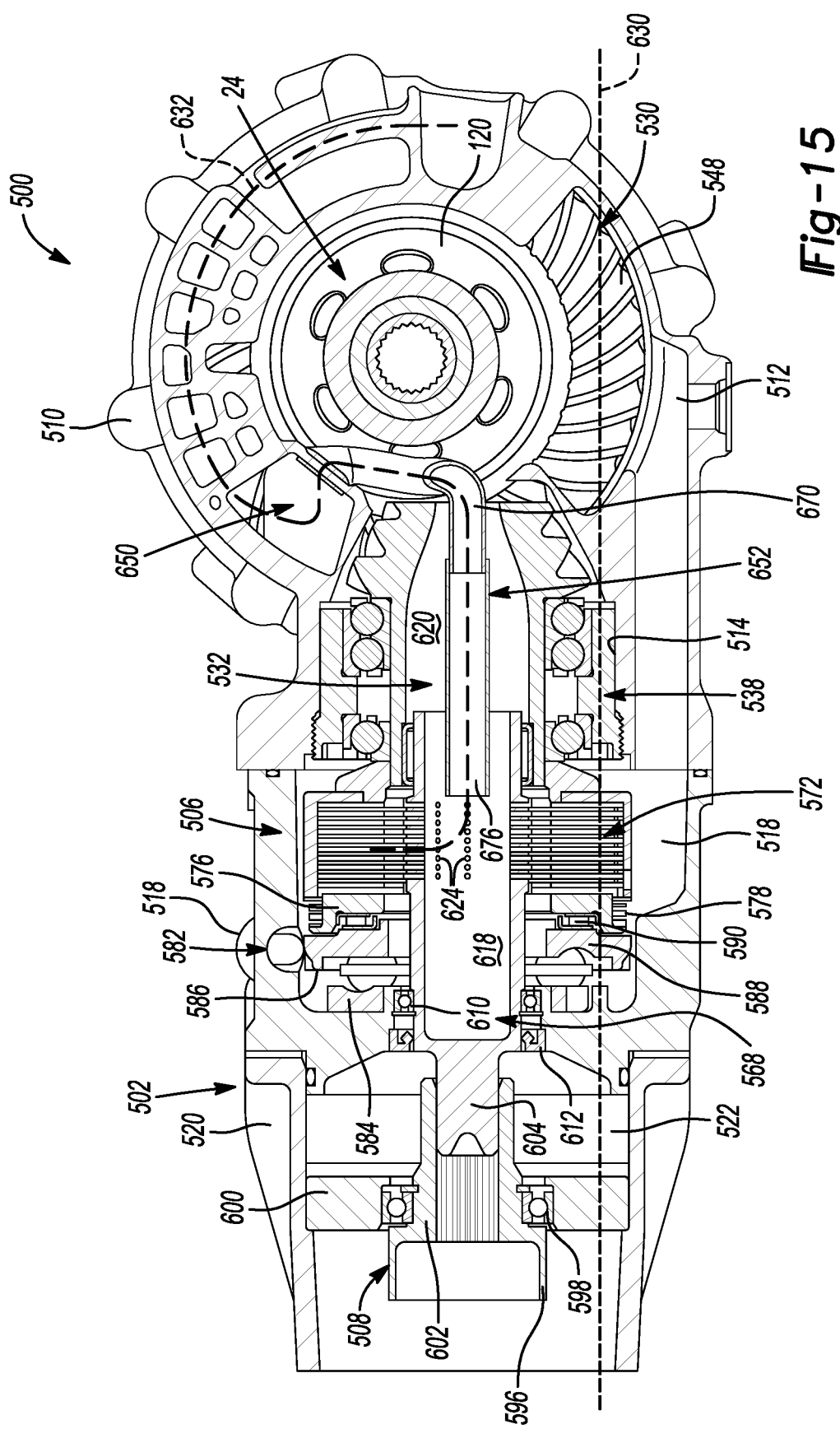
FIG. 15 is similar to FIG. 14 and now illustrating a lubricant flow path associated with the pumpless lubrication system.

As best illustrated in FIG. 15, clutch housing 516 is configured to be rigidly secured to axle housing 510 and to support torque transfer coupling 506 within clutch chamber 518. Torque transfer coupling 508 generally includes a clutch unit 560 and a power-operated clutch actuator unit 562. Clutch unit 560 is shown as a multi-plate friction clutch having a first clutch member or hub 564 secured to or integrally formed on a tubular shaft segment 566 of an input shaft 568, a second clutch member or drum 570 rigidly secured to an end portion of pinion shaft segment 534, and a multi-plate clutch pack 572 comprised of interleaved inner and outer clutch plates. The inner clutch plates are coupled for rotation with hub 564 while the outer clutch plates are coupled for rotation with drum 570. Clutch unit 560 also includes an axially moveable apply plate 576 and a biasing arrangement 578 configured to bias apply plate 576 in an axial direction away from clutch pack 572. Apply plate 576 is coupled for rotation with drum 570.

Power-operated clutch actuator unit 562 is shown, in this non-limiting configuration, to include a ballramp mechanism 580 and a powered driver mechanism 582. Ballramp mechanism 580 includes a stationary first cam ring 584 non-rotatably fixed to clutch housing 516, a rotatable and axially-moveable second cam ring 586, and a plurality of rollers 588 each being retained by a cage within an aligned pair of cam ramps formed in facing surfaces of first cam ring 584 and second cam ring 586. The cam ramps are configured such that rotation of second cam ring 586 relative to first cam ring 584 results in axial movement of second cam ring 586 relative to clutch pack 572. A thrust bearing 590 is disposed between second cam ring 586 and apply plate 576. Powered driver mechanism 582 may include an electric motor and a gearset configured to convert rotation of the motor's output shaft into rotation of second cam ring 586, thereby controlling the axial position of second cam ring 586 relative to clutch pack 576.

Coupling housing 520 is rigidly secured to clutch housing 516 and is configured to rotatably support coupling unit 508. Coupling unit 508 includes a coupler 596 rotatably supported via a bearing assembly 598 in a support plate 600 mounted in coupler chamber 522. Coupler 596 is adapted to be drivingly connected to propshaft 28' via connection to joint unit 29. Joint unit 29 can be attached directly to coupler 596. Coupler 596 includes a tubular stub shaft segment 602 configured to receive an end segment 604 of input shaft 568 therein. End segment 604 is fixed (i.e. splined, welded, etc.) for rotation with coupler 596. Input shaft 568 also includes tubular shaft segment 566. The end of shaft segment 566 adjacent to end segment 604 is rotatably supported by clutch housing 516 via a bearing assembly 610 and is sealed relative thereto via a rotary seal device 612. The opposite end of shaft segment 566 is supported for rotation relative to pinion shaft segment 534 of hollow pinion unit 532 via a bearing support assembly 616. Tubular shaft segment 566 of input shaft 568 defines an inner shaft chamber 618 in communication with an inner pinion chamber 620 formed in pinion unit 532. In addition, shaft segment 566 of input shaft 568 is formed to include circumferentially-aligned sets of lubrication bores 624 extending through hub 564 to permit lubricant to be directed into clutch pack 572. Line 630 schematically indicates an oil fill level within a lubricant sump defined within differential chamber 512, pinion chamber 514 and clutch chamber 518.

Figure 14:
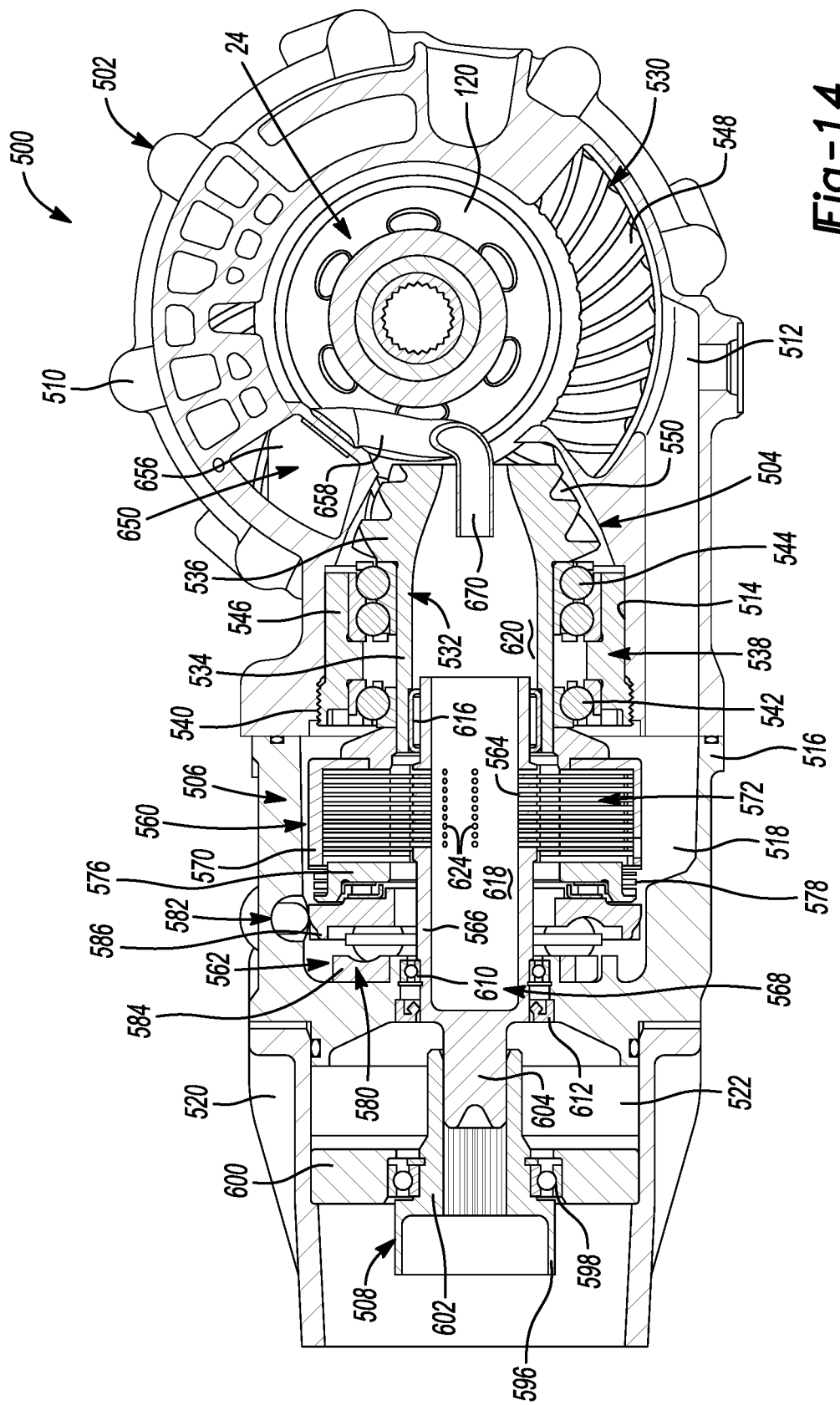
FIG. 14 is a sectional view of the drive axle assembly and torque transfer coupling associated with the AWD power transfer system of FIGS. 5 and 6, hereinafter referred to as a rear axle drive (RAD) assembly, and equipped with a pumpless lubrication system.
Figure 16:
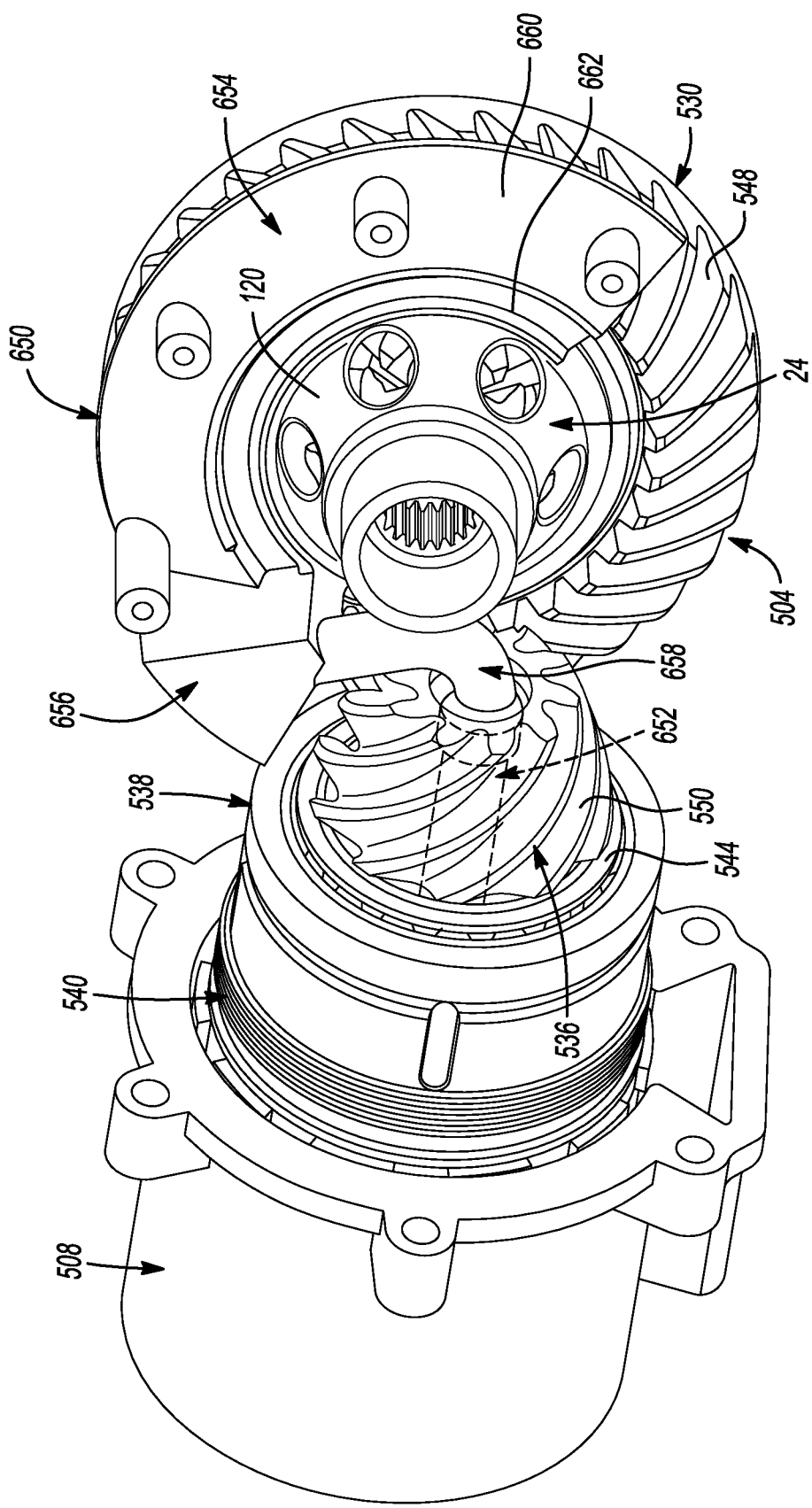
FIG. 16 is an isometric view of various components of the RAD assembly illustrating a lubrication collection reservoir and conduit assembly associated with the pumpless lubrication system.
Figure 17:
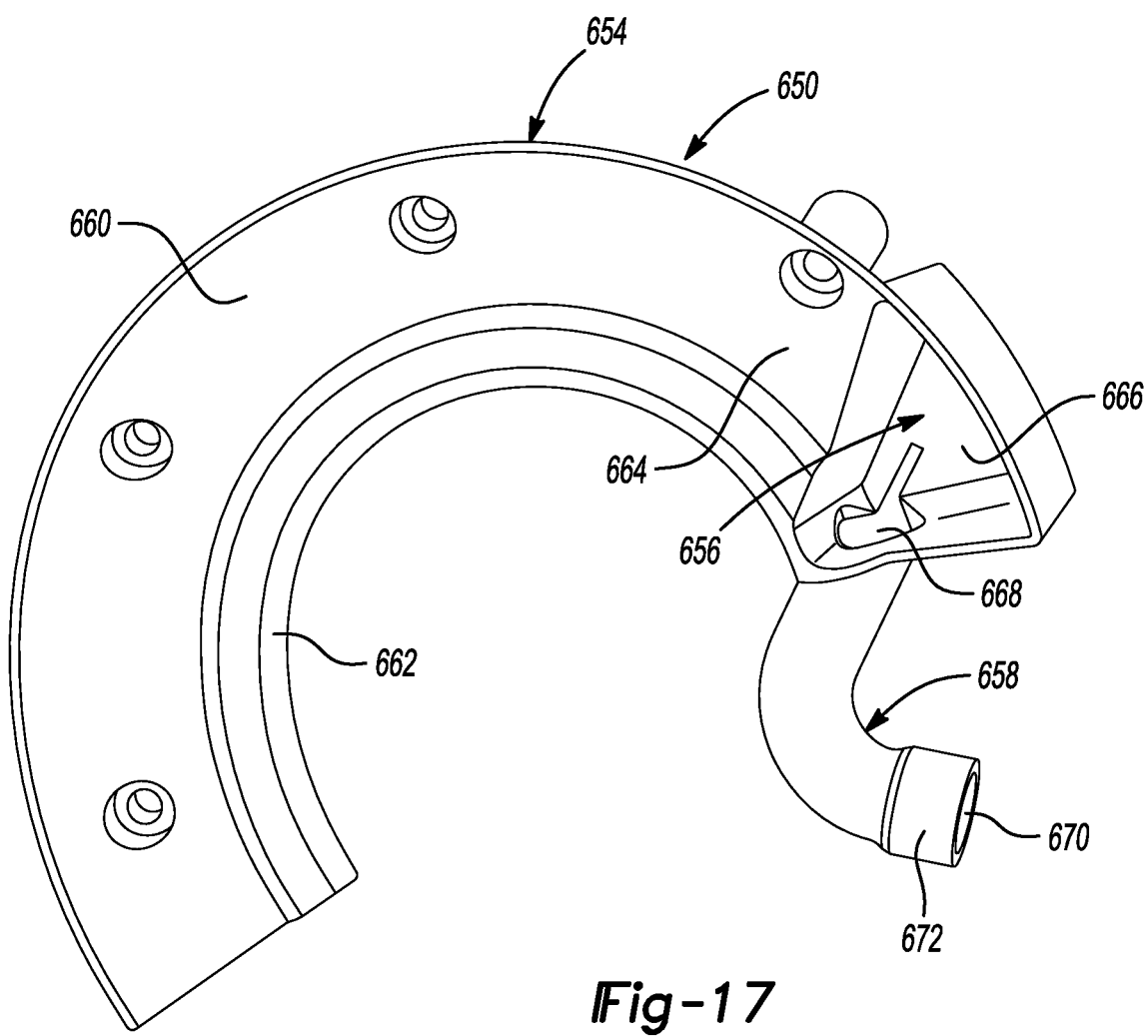
FIG. 17 is an opposite view of the collection reservoir and conduit assembly shown in FIG. 16.

In accordance with aspects of the present disclosure, ULRAD assembly 500 is equipped with a "pumpless" lubrication system for controlling delivery of the lubricant from differential chamber 512 into inner pinion chamber 620 within pinion unit 532 and inner shaft chamber 618 within input shaft segment 566 for delivery via lubrication bores 624 to lubricate and cool clutch pack 572. Arrow 632 provides an illustration of this flow path of the lubricant. The term "pumpless" indicates that no mechanical or electric oil pump is required within ULRAD assembly 500. FIGS. 16 and 17 illustrate the pumpless lubrication system to include a collector unit 650 and a conduit unit 652. Collector unit 650 is configured to be secured with differential chamber 512 of axle housing 510 and includes a collector plate segment 654, a collector reservoir segment 656, and a discharge connector segment 658. Collector plate segment 654 is an elongated arcuate component configured to be matingly aligned with gear teeth 548 on ring gear 530 and includes a tapered splash plate 660 and a raised rim flange 662 which together establish a frusto-conical splash chamber 664 for collecting lubricant discharged from rotation of ring gear 530. Collection reservoir segment 656 is a pie-shaped, recessed component defining an enlarged reservoir chamber 666 communicating with splash chamber 664 and having a discharge port 668. Discharge connector segment 658 is a tubular conduit component having a flow channel 670 in fluid communication with reservoir chamber 666 via discharge port 668. Flow channel 670 terminates with a female tube coupling section 672 configured to receive a male coupling section of conduit unit 652. It should be noted that tube coupling section 672 of discharge connector segment 658 is configured to extend into a portion of pinion chamber 620 associated with pinion gear segment 536 of pinion unit 532. FIG. 14 illustrates an arrangement where no elongated conduit unit 652 is utilized in cooperation with collector unit 652. However, FIGS. 15 and 16 illustrate the preferred combination of these two components. Specifically, conduit unit 652 is an elongated tubular component extending through pinion chamber 620 and into input shaft chamber 618. Conduit unit 652 has a flow channel 676 in fluid communication with flow channel 670 and which is located to discharge collected lubricant into input shaft chamber 618 in proximity to lubrication bores 624.

The pumpless lubrication system described above functions to collect splashed lubricant caused by rotation of ring gear 530 and transport the collected lubricant (via gravity) through the center of pinion unit 532 to optimally lubricate and cool the components of torque transfer coupling 508, and particularly the clutch plates of clutch pack 572. Collector unit 650 can include internal baffling to assist in capturing and transporting the collected lubricant to conduit unit 652. The length and diameter of conduit unit 652 can be varied to each specific vehicular power transfer application to tailor the amount and location of lubricant delivered to the clutch assembly and the bearings. Lubricant enters clutch pack 572 through lubrication bores 624 due to either centrifugal forces associated with rotation of input shaft 568 and/or filling of input shaft chamber 618. It is further understood that the structure of collector unit 650 can be formed (i.e. cast) integrally into differential chamber 512 of axial housing 510 such that collected lubricant is directed into a collection reservoir and transported via conduit unit 652 from the integral collection reservoir into pinion chamber 620 and input shaft chamber 618.

Figure 18:
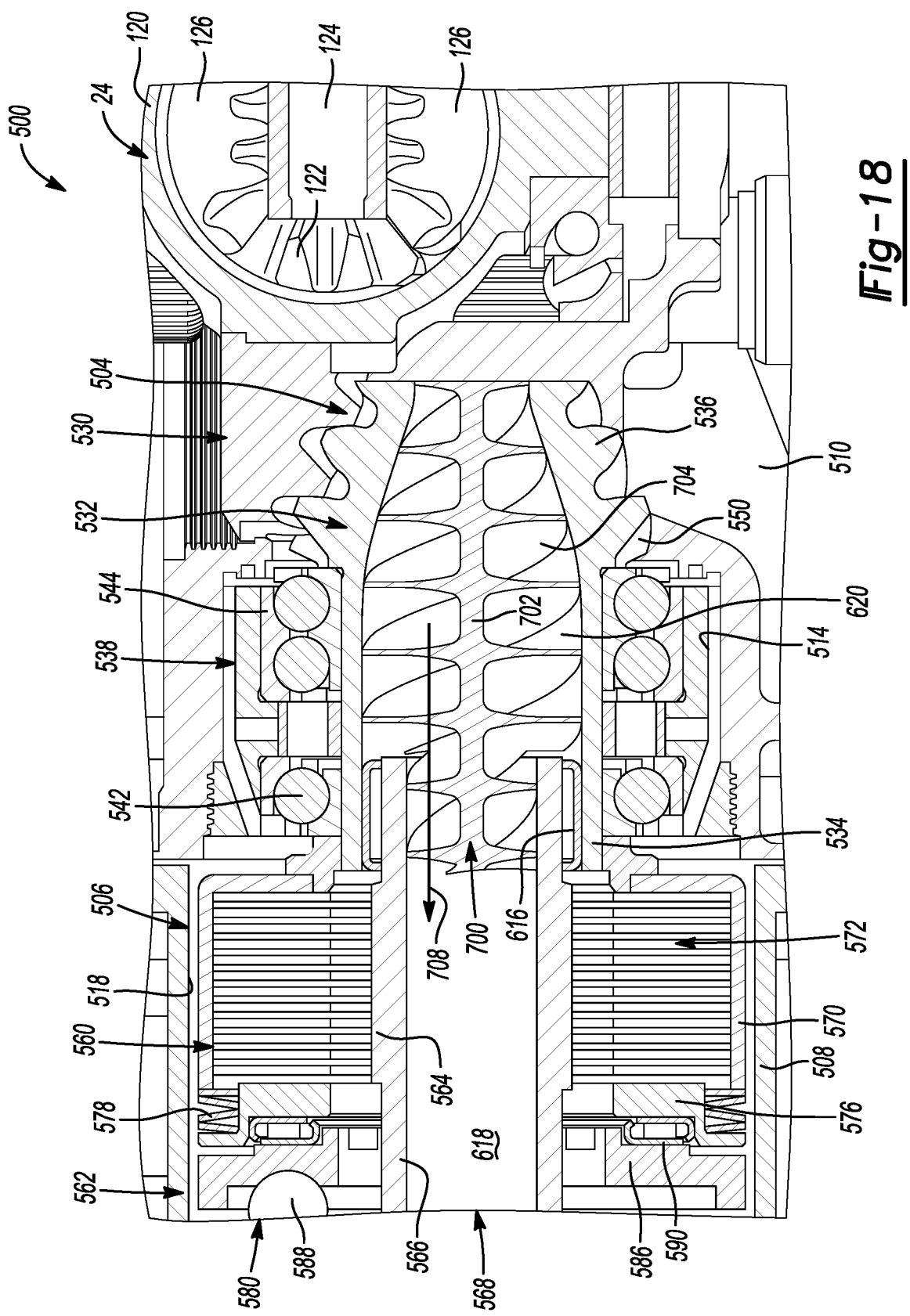
FIG. 18 is a sectional view of the RAD assembly equipped with an auger as part of the pumpless lubrication system.

Referring now to FIG. 18, another pumpless lubrication system is shown to include use of an auger 700 located within pinion chamber 620 of pinion unit 532. Auger 700 has a stem segment 702 from which one or more continuous helical threads 704 extend. Auger 700 can be fixed for rotation with either input shaft 568 or pinion shaft segment 534 such that lubricant is transported, due to rotation of auger 700, from differential chamber 512 into pinion chamber 620 for delivery to input shaft chamber 618, as indicated by arrow 708. Auger 700 can be a stand-alone lubrication component or, in the alternative, used in combination with the pumpless lubrication system disclosed in FIGS. 14-17. It will also be understood that a modified construction of collector unit 650 (either as separate component or integrated into the axle housing) can be configured to collect lubricant splashed from the teeth of pinion gear segment 536 and transport the collected lubricant from the collection reservoir via a conduit unit 652 through pinion unit 532. This modified version of collector unit 650 could also be configured to capture lubrication splashed from both of pinion gear segment 536 of pinion unit 532 and ring gear 530.

While the pumpless lubrication systems have been disclosed as being associated with the hypoid gearset with ULRAD assembly 500, those skilled in the art will appreciate the applicability of such lubrication systems in other power transfer devices including for example, and without limitations, PTU 90 (FIGS. 3 and 4) equipped with hypoid gearsets and a torque transfer coupling.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A power transfer assembly for a motor vehicle having a powertrain and a pair of wheels, comprising:
    a housing;
    a rotary input driven by the powertrain and including a tubular input shaft rotatably supported by the housing and defining an internal shaft chamber;
    a rotary output rotatably supported by the housing and drivingly connected to the pair of wheels;
    a hypoid gearset rotatably supported by the housing and including a ring gear driving the rotary output and a hollow pinion unit including a pinion gear segment meshed with the ring gear and a pinion shaft segment and which together define an internal pinion chamber;
    a torque transfer coupling operably disposed between the input shaft and the pinion shaft segment of the pinion unit, the torque transfer coupling being configured as a multi-plate clutch assembly having a first clutch member driven by the input shaft, a second clutch member driving the pinion shaft, and a clutch pack of alternating first and second clutch plates operably disposed between the first and second clutch members; and
    a pumpless lubrication system including a collector unit configured to capture lubricant splashed via rotation of at least one of the ring gear and the pinion gear segment and collect the splashed lubricant in a collection reservoir, and a conduit unit in fluid communication with the collection reservoir and arranged to transmit the lubricant collected in the collection reservoir through the internal pinion chamber and into the internal shaft chamber for lubricating and cooling the clutch pack, wherein the lubricant transmitted via the conduit unit is discharged in the shaft chamber, and wherein the input shaft includes lubrication bores for providing fluid communication between the shaft chamber and the clutch pack.

2. The power transfer assembly of claim 1, wherein the conduit unit is a tubular member passing through an opening in the pinion gear segment and the pinion chamber and extending into the shaft chamber.

3. The power transfer assembly of claim 2, wherein the conduit unit terminates before the lubrication bores.

4. The power transfer assembly of claim 1, wherein the collector unit is fixed to the housing and configured to surround a portion of the ring gear for capturing lubricant splashed from rotation of the ring gear, wherein the collector unit includes a collector plate segment arranged in proximity to the ring gear, a collector reservoir segment defining the collection reservoir, and a connector segment in fluid communication with the collection reservoir, and wherein the conduit unit is attached to the connector segment of the collector unit and configured to direct lubricant from the collection reservoir to the shaft chamber.

5. The power transfer assembly of claim 1, wherein the collector unit is integrally formed in the housing and includes a collector plate segment surrounding a portion of the ring gear, a collector reservoir segment defining the collection reservoir, and a connector segment in fluid communication with the collection reservoir, and wherein the conduit unit is attached to the connector segment and is configured to direct lubricant from the collection reservoir to the shaft chamber.

6. The power transfer assembly of claim 1, further comprising an auger fixed for rotation with the pinion unit and disposed within the pinion chamber, wherein the auger directs lubricant from the collection reservoir into the shaft chamber.

7. The power transfer assembly of claim 1, further comprising an auger disposed in the pinion chamber and fixed for rotation with the input shaft.

8. The power transfer assembly of claim 1, wherein the rotary output is a differential assembly.

9. The power transfer assembly of claim 1, wherein the torque transfer coupling includes a power-operated clutch actuator for selectively actuating the multi-plate clutch assembly for transferring drive torque generated by the powertrain from the input shaft to the pinion unit.

10. The power transfer assembly of claim 1, wherein the collector unit includes a collector plate segment surrounding a portion of the ring gear, a collector reservoir segment defining the collection reservoir, and a connector segment in fluid communication with the collection reservoir, and wherein the connector segment extends into the pinion chamber.

11. The power transfer assembly of claim 10, further comprising an auger disposed in the pinion chamber, and wherein the connector segment directs lubricant onto the auger.

12. The power transfer assembly of claim 10, wherein the connector segment extends from the collection reservoir and defines a bend before extending into the pinion chamber.

13. A power transfer assembly for a motor vehicle having a powertrain and a pair of wheels, comprising:
    a housing;

a rotary input driven by the powertrain and including an input shaft rotatably supported by the housing and defining an internal shaft chamber;

a rotary output rotatably supported by the housing and drivingly connected to the pair of wheels;

a hypoid gearset rotatably supported by the housing and including a ring gear driving the rotary output and a pinion unit including a pinion gear segment meshed with the ring gear and a pinion shaft segment and which together define an internal pinion chamber;

a torque transfer coupling operably disposed between the input shaft and the pinion shaft segment of the pinion unit; and a pumpless lubrication system including a collector unit configured to capture lubricant splashed via rotation of at least one of the ring gear and the pinin gear segment and collect the splashed lubricant in a collection reservoir, and a conduit unit configured to direct the lubricant collected in the collection reservoir through the pinion chamber to the torque transfer coupling, wherein the collector unit includes a collector plate segment surrounding a portion of the ring gear, a collector reservoir segment defining the collection reservoir, and a connector segment in fluid communication with the collection reservoir and which extends into the pinion chamber, and wherein the conduit unit is in fluid communication with the connector segment of the collector unit.

14. The power transfer assembly of claim 13, wherein the torque transfer coupling is a multi-plate clutch assembly having a clutch pack operably disposed between the input shaft and the pinion segment of the pinion unit, and wherein the lubricant transmitted from the collector unit to the conduit unit is discharged into at least one of the pinion chamber and the shaft chamber for lubricating the clutch pack.

15. The power transfer assembly of claim 13, wherein the conduit unit is a tubular member passing through an opening in the pinion gear segment and configured to discharge lubricant into the shaft chamber, and wherein lubricant passages formed in the input shaft permit the lubricant to flow from the shaft chamber to the clutch pack.

16. A power transfer assembly for a motor vehicle having a powertrain and a pair of wheels, comprising:

a housing;

a rotary input driven by the powertrain and including a tubular input shaft rotatably supported by the housing and defining an internal shaft chamber;

a rotary output rotatably supported by the housing and driving the pair of wheels;

a hypoid gearset rotatably supported by the housing and including a ring gear driving the rotary output and a hollow pinion unit including a pinion gear segment meshed with the ring gear and a pinion shaft segment extending from the pinion gear segment and which together define an internal pinion chamber;

a multi-plate clutch assembly operably disposed between the input shaft and the pinion shaft segment of the pinion unit and including a clutch pack; and a pumpless lubrication system including a collector unit and a conduit unit, the collector unit configured to capture lubricant splashed via rotation of at least one of the ring gear and the pinion gear segment and collect the splashed lubricant in a collection reservoir, the conduit unit configured to transmit the lubricant from the collection reservoir to the shaft chamber, wherein lubrication passages formed in the input shaft provide fluid communication between the shaft chamber and the clutch pack, wherein the collector unit is fixed to or formed integrally with the housing and configured to include a collector plate segment arranged in proximity to the ring gear for capturing lubricant splashed from the ring gear, a collector reservoir segment defining the collection reservoir, and a connector segment in fluid communication with the collection reservoir, and wherein the conduit unit is attached to the connector segment and extends through the pinion chamber for discharging the lubricant in the shaft chamber.

17. A power transfer assembly for a motor vehicle having a powertrain and a pair of wheels, comprising:

a housing;

a rotary input driven by the powertrain and including a tubular input shaft rotatably supported by the housing to define an internal shaft chamber;

a rotary output rotatably supported by the housing and drivingly connected to the pair of wheels;

a hypoid geraset rotatably supported by the housing and including a ring gear driving the rotary output and a hollow pinion unit including a pinion gear segment meshed with the ring gear and a pinion shaft segment and which together define an internal pinion chamber;

a torque transfer coupling operably disposed between the input shaft and the pinion shaft segment of the pinion unit, the torque transfer coupling including a multi-plate clutch assembly having a first clutch member driven by the input shaft, a second clutch member driving the pinion unit, and a clutch pack of alternating first and second clutch plates operably disposed between the first and second clutch members; and a pumpless lubrication system including a collector unit and a conduit unit, the collector unit configured to capture lubricant splashed via rotation of at least one of the ring gear and the pinion gear segment and collect the splashed lubricant in a collection reservoir, the conduit unit being in fluid communication with the collection reservoir and arranged to transmit the lubricant collected in the collection reservoir through the internal pinion chamber and into the internal shaft chamber for lubricating the torque transfer coupling, wherein the collector unit includes a collector plate segment surrounding a portion of the ring gear, a collector reservoir segment defining the collection reservoir, and a connector segment in fluid communication with the collection reservoir and which extends into the pinion chamber.

\* \* \* \* \*